US007904722B2

(12) United States Patent
Sudia et al.

(10) Patent No.: US 7,904,722 B2
(45) Date of Patent: Mar. 8, 2011

(54) METHOD FOR SECURELY USING DIGITAL SIGNATURES IN A COMMERCIAL CRYPTOGRAPHIC SYSTEM

(75) Inventors: Frank W. Sudia, Newton Centre, MA (US); Brian Siritzky, Rockville, MD (US)

(73) Assignee: Certco, LLC, New York, NY (US)

( * ) Notice: Subject to any disclaimer, the term of this patent is extended or adjusted under 35 U.S.C. 154(b) by 1948 days.

(21) Appl. No.: 09/870,584

(22) Filed: Jun. 1, 2001

(65) Prior Publication Data

US 2002/0029337 A1 Mar. 7, 2002

Related U.S. Application Data

(63) Continuation of application No. 08/786,046, filed on Jan. 21, 1997, now abandoned, which is a continuation of application No. PCT/US95/09076, filed on Jul. 19, 1995, now abandoned, which is a continuation-in-part of application No. 08/277,438, filed on Jul. 19, 1994, now abandoned.

(51) Int. Cl.
*H04L 9/00* (2006.01)

(52) U.S. Cl. ........................................ 713/176; 713/156

(58) Field of Classification Search .......... 713/155–158, 713/175, 170, 176, 180; 380/30, 272, 282, 380/286; 726/6, 18
See application file for complete search history.

(56) References Cited

U.S. PATENT DOCUMENTS

| 4,625,076 A | | 11/1986 | Okamoto et al. | 380/25 |
|---|---|---|---|---|
| 4,953,209 A | * | 8/1990 | Ryder et al. | 705/59 |
| 4,981,370 A | | 1/1991 | Dziewit et al. | 380/25 |
| 5,005,200 A | | 4/1991 | Fischer | 380/30 |
| 5,031,214 A | | 7/1991 | Dziewit et al. | 380/23 |
| 5,157,726 A | | 10/1992 | Merkle et al. | 380/23 |
| 5,163,091 A | | 11/1992 | Graziano et al. | 380/25 |
| 5,164,988 A | | 11/1992 | Matyas | |
| 5,191,613 A | | 3/1993 | Graziano et al. | 380/25 |
| 5,214,702 A | * | 5/1993 | Fischer | 380/30 |
| 5,224,163 A | * | 6/1993 | Gasser et al. | 380/30 |
| 5,436,974 A | | 7/1995 | Kovanen | 380/51 |
| 5,450,489 A | * | 9/1995 | Ostrover et al. | 705/51 |
| 5,621,797 A | | 4/1997 | Rosen | 380/24 |

(Continued)

FOREIGN PATENT DOCUMENTS

EP 0771499 B1 * 9/2005

(Continued)

OTHER PUBLICATIONS

Ding, Undetectable on-line password guessing attacks, 1995, ACM, vol. 29, pp. 77-86.*

(Continued)

*Primary Examiner* — Beemnet W Dada
(74) *Attorney, Agent, or Firm* — Pillsbury Winthrop Shaw Pittman LLP

(57) ABSTRACT

A system for securely using digital signatures in a commercial cryptographic system that allows industry-wide security policy and authorization information to be encoded into the signatures and certificates by employing attribute certificates to enforce policy and authorization requirements. Verification of policy and authorization requirements is enforced in the system by restricting access to public keys to users who have digitally signed and agreed to follow rules of the system. These rules can also ensure that payment is made for public and private key usage. Additionally, users can impose their own rules and policy requirements on transactions in the system.

28 Claims, 17 Drawing Sheets

U.S. PATENT DOCUMENTS

| | | | | |
|---|---|---|---|---|
| 5,659,616 | A | | 8/1997 | Sudia .............................. 380/23 |
| 5,745,574 | A | * | 4/1998 | Muftic .......................... 713/157 |
| 5,852,666 | A | * | 12/1998 | Miller et al. .................. 713/167 |
| 5,940,510 | A | * | 8/1999 | Curry et al. ..................... 705/65 |

FOREIGN PATENT DOCUMENTS

| | | |
|---|---|---|
| RU | 2 007 884 | 2/1994 |
| WO | WO 95/01686 | 1/1995 |
| WO | WO 95/14283 | 5/1995 |

OTHER PUBLICATIONS

J. Linn, Privacy Enhancement for Internet Electronic Mail: Part I, Feb. 1993, pp. 1-42.

S. Kent, Privacy Enhancement for Internet Electronic Mail: Part II, Feb. 1993, pp. 1-32.

X12.58 Version 2, ASC X-12 Draft Standard . . . Managing Electronic Data Interchange, pp. 1-40.

Financial Institution Sign-On Authentication for Wholesale Financial Transactions X9.26, Approved: Feb. 28, 1990, pp. 1-25.

Draft ANSI X9.30-199x, Public Key Cryptography Using Irreversible Algorithms for the Financial Services Industry: Part 3, Nov. 18, 1993, pp. 1-6.

PKCS #7: Cryptographic Message Syntax Standard Version 1.5, Revised Nov. 1, 1993, pp. 1-30.

PKCS #7: Cryptographic Message Syntax Standard Version 1.4, Jun. 3, 1991, pp. 1-24.

Recommendation X.500: The Directory-Overview of Concepts, Models and Services, Melbourne, 1988, pp. 1-13.

Robert Jueneman, Limiting the Liability of CAs and Individuals regarding the use of Digital Signatures, Jun. 30, 1993, pp. 1-8.

J. Linn, Practical Authentication for Distributed Computing, IEEE, 1990, pp. 32-40.

Morrie Gasser et al., An Architecture for Practical Delegation in a Distributed System, IEEE, 1990, pp. 20-30.

Denis Pinkas et al., SESAME: Secure European System for Applications in a Multivendor Environment, Issue 1, Feb. 1993.

Information Technology—Open Systems Interconnection—The Directory: Authentication Framework—Recommendation X.509 ISO/IEC 9594-8 (1993), pp. i-35.

Accredited Standards Committee X9, X9-Financial Services, Public Key Cryptography Using Irreversible Algorithms for the Financial Services Industry: Part 3, Oct. 7, 1994, pp. i-81.

Frank Sudia and Richard Ankney, Commercialization of Digital Signatures, Jul. 20, Boston, pp. 1-16.

Addison M. Fischer, Electronic Document Authorization, National Computer Security Conference, 1992, pp. 1-23.

ECMA—Standard ECMA-138—Security in Open Systems—Data Elements and Service Definitions, Dec. 1989, pp. i-81.

ECMA—Security in Open Systems a Security Framework, ECMA TC/46, Jul. 1988, pp. i-71.

Secure Data Network System, Access Control Specification, Access Control Information Specification (ACIS) Addendum 1 (SDN.802/1), Jul. 25, 1989, pp. ii-85.

Secure Data Network System, Access Control Specification, SDN. 802, Rev. 1.0, Jul. 25, 1989, pp. 1-43.

Secure Data Network System, Access Control Concept Document (Revision 1.3), Sdn.801, Jul. 26, 1989, pp. 1-18.

European Computer Manufacturers Association, Standard ECMA-138 Security in Open Systems—Data Elements and Service Definitions, Dec. 1989, pp. i-81.

Addison Fischer, Workflow.2000-Electronic Document Authorization in Practice, Fischer International Systems Corporation, Copyright 1992, 7 pages.

Richard Ankney, Certificate Management for the Financial Services Industry, ABA/Scitech/Notaization and Nonrepudiation WG.

ANSI X9.30 (Working Draft) Public Key Cryptography Using Irreversible Algorithms for the Financial Services Industry: Part 3: Certificate Management for DSA, Mar. 29, 1993, pp. i-71.

ANSI X9.30-199X (Working Draft) Public Key Cryptography Using Irreversible Algorithms for the Financial Services Industry: Part 3: Certificate Management for DSA, Sep. 27, 1993, pp. i-87.

Rich Ankney et al., Enhanced Management Controls Using Attribute Certificates, ASC Proposal No. X9F1-3, Nov. 10, 1993, 13 pages.

ANSI X9.30-199x (Draft), Executive Summary, Public Key Cryptography Using Irreversible Algorithms for the Financial Services Industry: Part 3: Certificate Management for DSA, Nov. 18, 1993, pp. 1-6.

ANSI X9.xx-199x (Working Draft), Enhanced Management Controls Using Attribute Certificates, Jan. 3, 1994, pp. 1-18.

ANSI X9.30-199x (Working Draft), Public Key Cryptography Using Reversible Algorithms for the Financial Services Industry: Part 3: Certificate Management for DSA, Jun. 1, 1994, pp. i-86.

Official Action of Grant as issued for Russian Patent Application No. 97102357/09(002648), dated May 27, 1999.

Official Action as issued for Russian Patent Application No. 97102357/09(002648), 1998.

International Preliminary Examination Report as issued for PCT/US95/09076, dated Sep. 18, 1996.

International Search Report as issued for PCT/US95/09076, dated Jan. 29, 1996.

Notice for Submission of Opinion as issued for Korean Patent Application No. 1997-0700352, dated Apr. 25, 2002.

Notification of the First Office Action as issued for Chinese Patent Application No. 95194241.7, dated Aug. 9, 2002.

Communication from the European Patent Office as issued for European Patent Application No. 95934957.2, dated Jan. 5, 2001.

Communication from the European Patent Office as issued for European Patent Application No. 95934957.2, dated Aug. 21, 2003.

* cited by examiner (a) SYMMETRIC ENCRYPTION (b) ASYMMETRIC ENCRYPTION

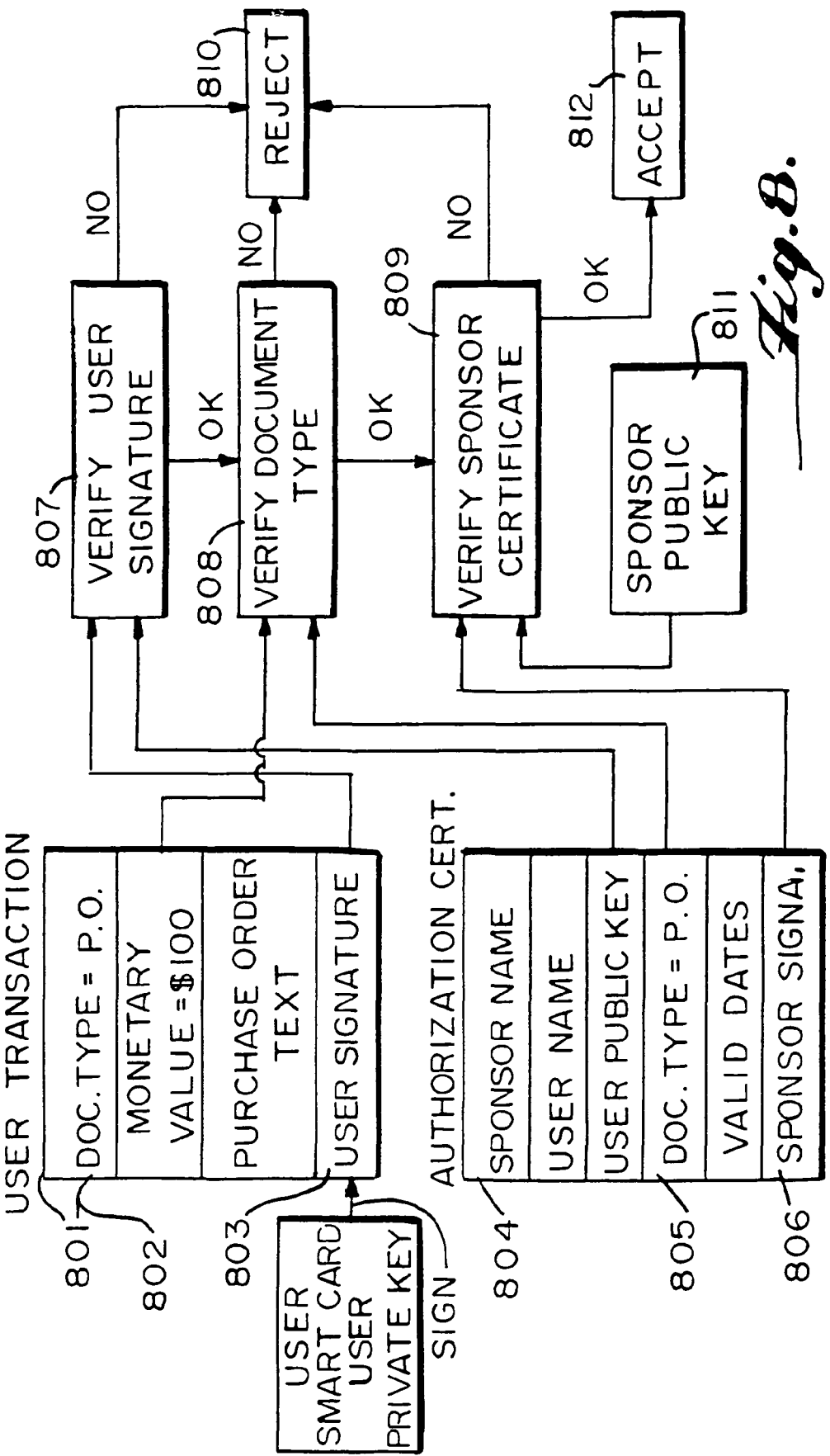

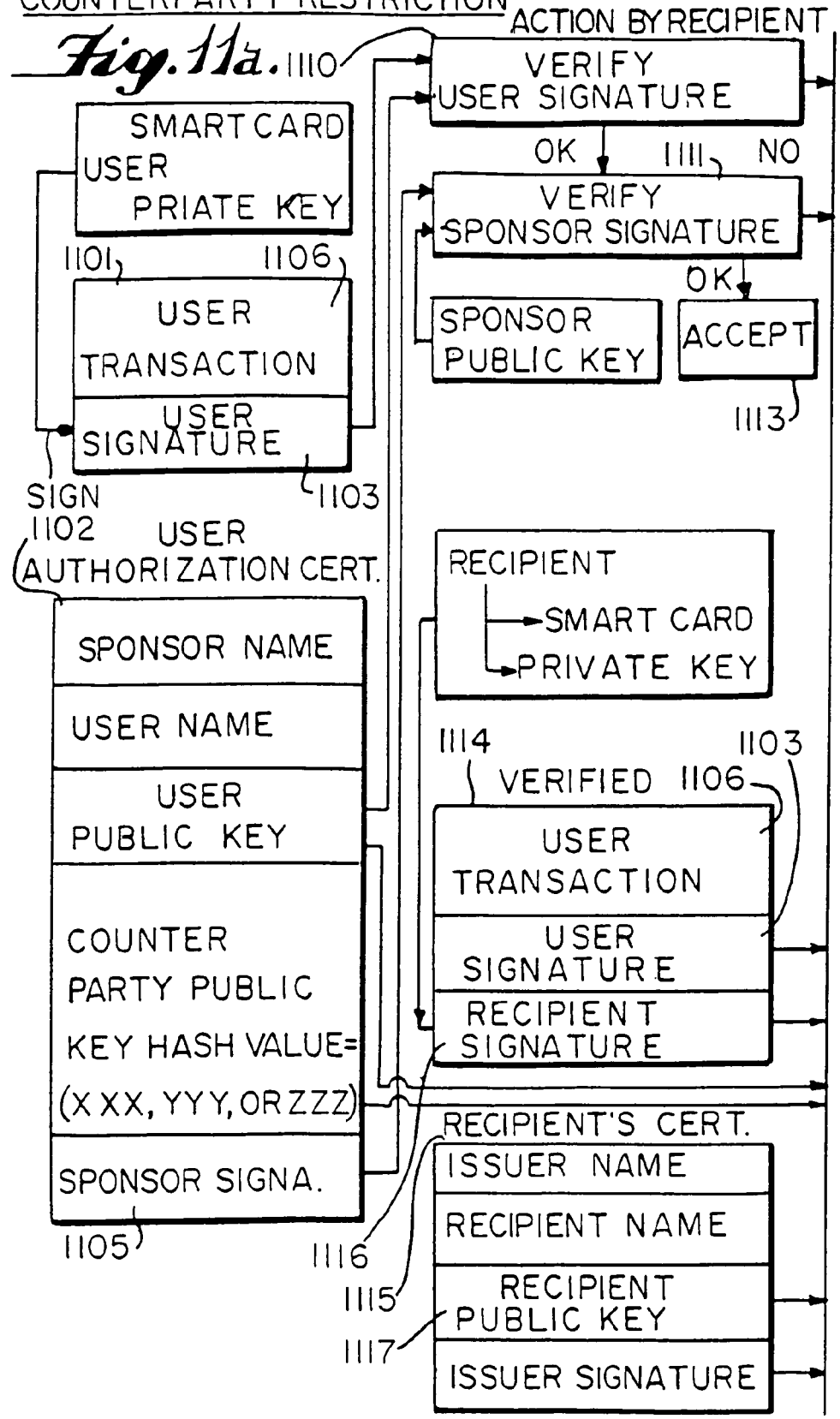

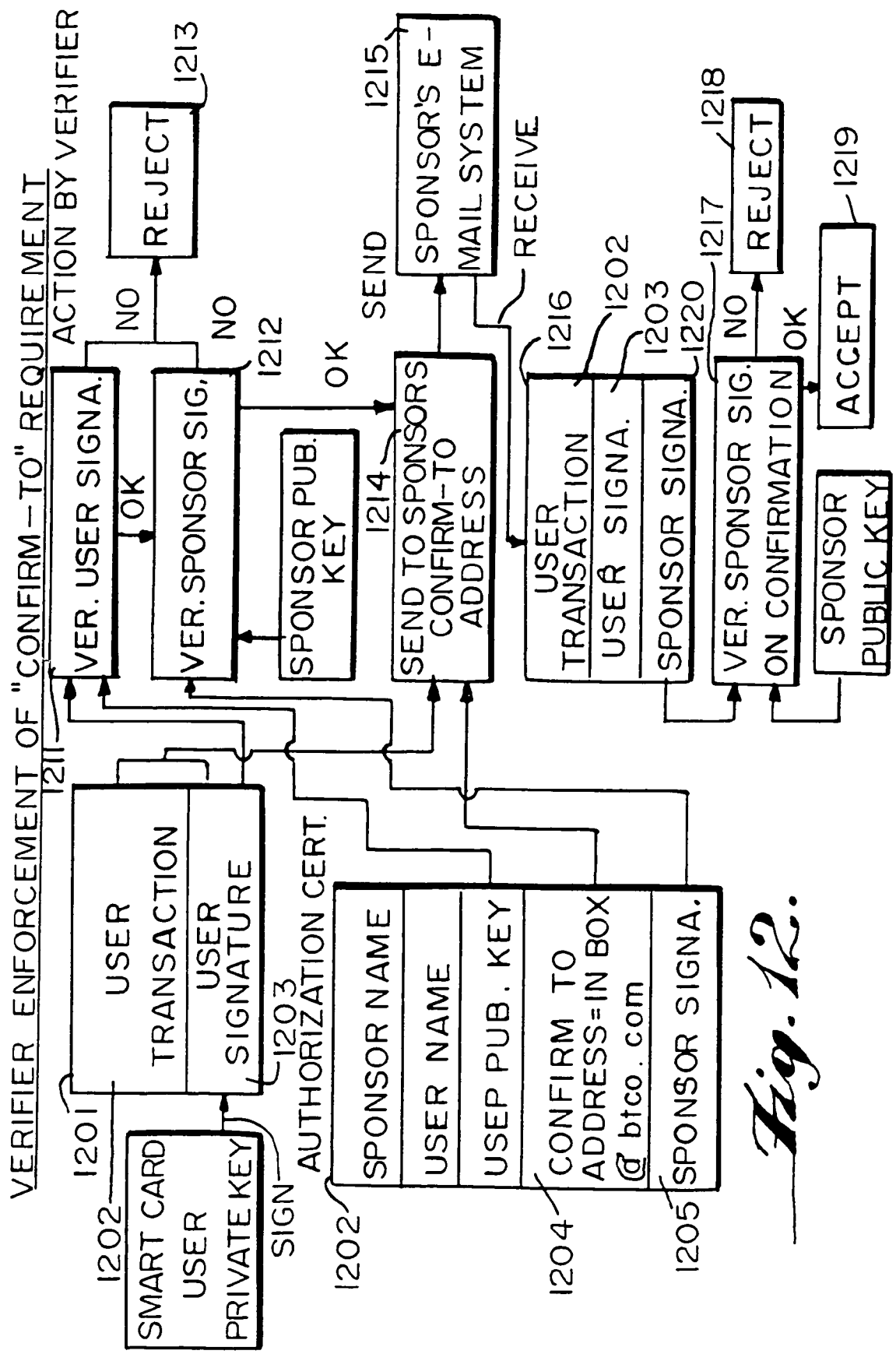

US 7,904,722 B2

METHOD FOR SECURELY USING DIGITAL SIGNATURES IN A COMMERCIAL CRYPTOGRAPHIC SYSTEM

This application is a continuation application of U.S. patent application Ser. No. 08/786,046, titled "Method for Securely Using Digital Signatures in a Commercial Cryptographic System," filed Jan. 21, 1997 (now abandoned), which was a continuation application of International Patent Application No. PCT/US95/09076, titled "Method for Securely Using Digital Signatures in a Commercial Cryptographic System," filed Jul. 19, 1995 and which designated the United States and was published in English (now abandoned), which was a continuation-in-part application of U.S. patent application Ser. No. 08/277,438, titled "Method for Securely Using Digital Signatures in a Commercial Cryptographic System," filed Jul. 19, 1994 (now abandoned).

BACKGROUND OF THE INVENTION

This invention relates to digital signatures. More particularly, this invention relates to the use of digital signatures and certificates for digital signatures in a commercial cryptographic system for enforcing security policies and authorization requirements in a manner that reduces risks to the users.

Public-key cryptography is a modern computer security technology that can support the creation of paperless electronic document systems, providing that the user's digital signature on an electronic document, that is, the user's electronic authentication and verification of the electronic document, can be given sufficient practical and legal meaning. Such paperless electronic document systems, or "document architectures," will encompass not only trading partners operating under standard bilateral contracts but also global multilateral systems in which any entity can, in theory, correspond with any other entity in a legally provable manner, assuming that proper security controls are observed throughout.

These systems will have enormous commercial significance because, in many cases, cost reductions on the order of 10-to-1 can be realized over current paper transaction procedures. This improvement is sufficiently dramatic such that many organizations would, for economic and competitive reasons, be compelled to use them once their practicality had been demonstrated.

No one disputes that paper is a bothersome anachronism in the electronic world or that verifying pen-and-ink signatures is costly and error-prone. At least with paper, however, the signer retains the basic "contextual controls" of document preparation and physical delivery. On a digitally signed electronic document, on the other hand, a signer controls only the encoded signature. All time, place and manner controls are absent, and nothing distinguishes a valid user signature from one fraudulently produced by another user who somehow obtained the first user's smart card and PIN. It would not take too many multi-million or multi-billion dollar losses to erase all the savings produced by this "newfangled" office-automation technology. Therefore, digital signatures will see early use only in consumer "electronic coin purse" applications, where exposure is low, and in wholesale financial transfers, as to which extremely tight security procedures are already the norm. However, these uses will have little general commercial impact.

Thus far, major corporations and banks have declined to invest in these technologies due to lack of well-defined risk models and auditing standards and due to uncertainties regarding legal and liability issues. Serious investments to commercialize digital signatures will occur only after leading national auditing and legal experts have ruled that these systems contain adequate security controls to warrant reliance in mainstream intra- and inter-corporate business transactions, typically in the $10,000 to $10 million range. In order for this goal to be achieved, security controls must be formulated to reduce the risks of participants in digital signature document systems to the absolute lowest level technically achievable.

There are two types of cryptographic systems in which digital signatures have been used: symmetric and asymmetric cryptographic systems. FIGS. 1(a) and 1(b) illustrate the use of symmetric and asymmetric algorithms for encryption. In symmetric (conventional) cryptography, as shown in FIG. 1(a), the sender and recipient of a communication share a secret key 11. This key is used by the sender, the originator of a communication, to encrypt the message 12 and by the recipient of the communication to decrypt the message 13. It may also be used by the recipient to authenticate a message by having the sender use the secret key to compute some function such as a Message Authentication Code (MAC) based upon the message; the recipient thus can be assured of the identity of the originator, because only the sender and the recipient know the secret key used to compute the MAC. DES is an example of a symmetric cryptographic system.

In asymmetric (public key) cryptography, shown in FIG. 1(b), different keys are used to encrypt and decrypt a message. Each user is associated with a pair of keys. One key 15 (the public key) is publicly known and is used to encrypt messages 17 destined for that user, and the other key 16 (the private key) is known only to that user and is used to decrypt incoming messages 18. Since the public key need not be kept secret, it is no longer necessary to secretly convey a shared encryption key between communicating parties prior to exchanging confidential traffic or authenticating messages. RSA is the most well-known asymmetric algorithm.

A digital signature, however, is a block of data appended to a message data unit, and allows the recipient to prove the origin of the message data unit and to protect it against forgery. Some asymmetric algorithms (for example, RSA) can also provide authentication and non-repudiation through use of digital signatures. In order to sign data, the sender encrypts the data under his own private key. In order to validate the data, the recipient decrypts it with the sender's public key. If the message is successfully decrypted using the sender's public key, the message must originally have been encrypted by the sender, because the sender is the only entity that knows the corresponding private key. Using this method of signing documents, the encrypted message is bound to the signature, because the recipient cannot read the message without decrypting the signature data block. The signature-encrypted message can then be encrypted to the recipient using the recipient's public key, as usual.

Digital signatures may also be formed using asymmetric encryption algorithms as described below and as illustrated in FIG. 2. To sign a message, the message 20 is first digested (hashed) into a single block 22 using a one-way hash function 21. A one-way hash function has the property that, given the digest, it is computationally infeasible to construct any message that hashes to that value or to find two messages that hash to the same digest. The digest 22 is then encrypted with the user's private key 23, and the result 24 is appended to the encrypted or unencrypted message as its signature 25. The recipient uses the sender's public key 26 to decrypt the signature 25 into the hash digest 22. The recipient also digests (hashes) the message 20, which has been received either unencrypted or encrypted and then decrypted by the recipient, into a block 27 using the same one-way hash function 21 used by the sender. The recipient then verifies 28 the sender's signature by checking that the decrypted hash digest 22 is the same as the hashed message digest 27.

Separating the signature from the message in this way, that is, not requiring the sender and recipient to encrypt and decrypt the entire message in order to verify the signature, greatly reduces the amount of data to be encrypted. This is important because public key algorithms are generally substantially slower than conventional algorithms, and processing the entire message in order to verify a signature would require a significant amount of time. The signature process also introduces redundancy into the message, which, because the message must hash to the specified digest, allows the recipient to detect unauthorized changes to the message.

A digital signature provides the security services of (a) integrity, because any modification of the data being signed will result in a different digest and thus a different signature; (b) origin authentication, because only the holder of the private key corresponding to the public key used for validation of the signature could have signed the message; and (c) non-repudiation, as irrevocable proof to a third party that only the signer, and not the recipient or its employees, could have created the signature. A symmetric secret key authenticator, for example the X9.9 MAC, does not provide these services, since either of the two parties can create the authenticator using their shared key.

Several of the mechanisms discussed herein assume the ability to attach multiple signatures or cosignatures to a document. A useful format for this purpose, as is well known in the art, is defined in "PKCS #7: Cryptographic Message Syntax," RSA Data Security, Inc., 1993, which is hereby incorporated by reference. Each signature structure on a document will contain an indication of the certificate needed to validate the signature along with a bit string containing the actual signature. Additionally, other information relevant to the particular signer may be included in an individual signature computation. This per-signer information may be included in the signature computation as "signature attributes."

In order for one user to identify another user for transmission of a message in a way that ensures the second user's possession of a private key, the first user must be able to obtain the other user's public key from a trusted source. As is well-known in the art, a framework for the use of public key certificates was defined in "X.509: The Directory: Authentication Framework," CCITT, April, 1993 ("X.509"), which is hereby incorporated by reference. These basic public key certificates bind a user's name to a public key and are signed by a trusted issuer called a Certification Authority (CA). Besides containing the user's name and public key, the certificate also contains the issuing CA's name, a serial number and a validity period.

Although X.509 does not impose any particular structure on the CAs, many implementations find it reasonable to impose a hierarchical structure in which each CA (in general) certifies only entities that are subordinate to it. Hence, we can construct a hierarchy of Cas, as shown in FIG. 3, in which the higher level CAS 31 (perhaps banks) sign the certificates 34 of the CAs 32 beneath them (for example, companies), and the lowest level of CAs 32 sign user 33 certificates 35. At the top of this hierarchy (not shown) are a relatively few other root CAs, perhaps one per country, that may "cross-certify" each other's public keys (root keys).

Various security architectures define mechanisms to construct a certification path through the hierarchy to obtain a given user's certificate and all CA certificates necessary to validate it. These architectures share the common characteristic that a user need trust only one other public key in order to obtain and validate any other certificate. The trusted key may be that of the top-level CA (in a centralized trust model) or of the local CA that issued the user's certificate (in a decentralized model).

Certificates also contain an expiration date. If it is necessary to cancel a certificate prior to its expiration date, such as if the name association becomes invalid or the corresponding private key is lost or compromised, the certificate may be added to the CA's certificate revocation list (CRL) or "hot list." This list is signed by the CA and widely distributed, possibly as part of the CA's directory entry. The certificate remains on the CRL until the certificate's expiration date.

Often certain information concerning an entity or CA needs to be made available in a trusted manner. In a secure X.500 Directory, this information would be retrieved via standard Directory operations and the result would be signed by the Directory. In the absence of such a secure X.500 implementation, this information is placed in an attribute certificate, which is signed by a CA in the same manner as the public key certificate. Attribute certificates would be created on presentation of the proper credentials by the user. For example, the user would present his public key certificate and prove he possesses the corresponding private key, as one form of identification. Attribute certificates are linked to the user's basic public key certificate by referencing the basic certificate's serial number and are revoked by an identical parallel CRL mechanism. Attribute certificates are discussed further in "X9.30 Part 3: Certificate Management for DSA," ANSI X9F1, June, 1994, and U.S. Pat. Nos. 4,868,877, 5,005,200 and 5,214,702, which are all well-known in the art and are all hereby incorporated by reference.

An attribute certificate is a structure separate from a public key certificate because proper separation of duties may often require that the CA that issues the attribute certificate be different than the CA that issues the public key certificate. A central CA might rarely of itself possess the required security or authority to "sign for" all of a user's authorizations. Having separate CAs generate various types of attribute certificates distributes risks more appropriately. In addition, the defined attributes may not be required for all domains, networks or applications. The need for these attributes and for additional domain-specific attributes is determined by each domain.

The user's basic public key certificate remains X.509 compatible, allowing its use with other applications and allowing use of commercial products for certificate generation.

It is desirable to be able to construct a trusted organization that utilizes digital signature and certificate mechanisms to enforce a security policy defined by rules within this organizational structure.

It is also desirable to use digital signature and certificate mechanisms to encode industry-wide security policy and authorization information into the signatures and certificates in order to permit the verifier of a signature to decide whether to accept the signature or certificate as valid, thus accommodating and easing electronic commerce business transactions.

It is further desirable to reduce the risks associated with digital signature systems, particularly with end-user smart cards, by building on this use of public key certificates and attribute certificates.

It is further desirable to prevent the use of such a digital signature system by any party that might purport to "accept" a transaction in contravention of the applicable authorization certificates when that party had not signed the applicable "system rules" agreement pertaining to that system of communicating signer authorization.

SUMMARY OF THE INVENTION

These and other objects of the invention are accomplished in accordance with the principles of the invention by providing a system for securely using digital signatures in a commercial cryptographic system that allows industry-wide security policy and authorization information to be encoded into the signatures and certificates by employing attribute certificates to enforce policy and authorization requirements. In addition to value limits, cosignature requirements and document type restrictions that can be placed on transactions, an organization can enforce with respect to any transaction geographical and temporal controls, age-of-signature limitations, pre-approved counterparty limitations and confirm-to requirements by using attribute certificates for the transacting user. Restrictions on distribution of certificates can be set using attribute certificates. Certificates can be used also to ensure key confinement and non-decryption requirements of smartcards in this system.

BRIEF DESCRIPTION OF THE DRAWINGS

The above and other objects and advantages of the invention will be apparent upon consideration of the following detailed description, taken in conjunction with the accompanying drawings, in which the reference characters refer to like parts throughout and in which:

FIG. 8 is a flow chart illustrating the process of verifier enforcement of a transaction document-type restriction;

FIG. 12 is a flow chart illustrating the process of verifier enforcement of a transaction "confirm-to" requirement;

DETAILED DESCRIPTION OF THE INVENTION

Figure 1A:
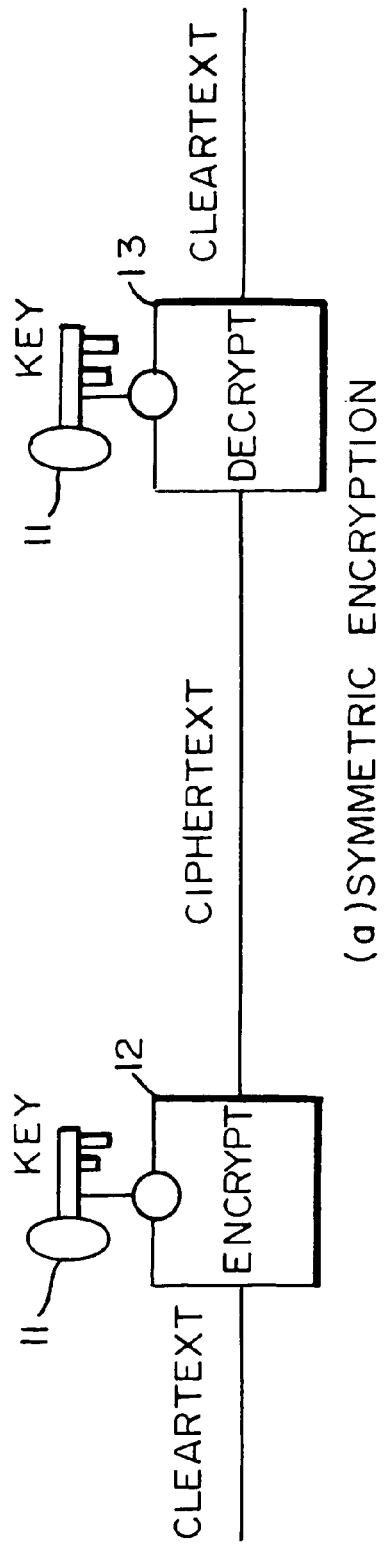
FIGS. 1(a) and 1(b) show the prior art use of symmetric and asymmetric algorithms for encryption.
Figure 1B:
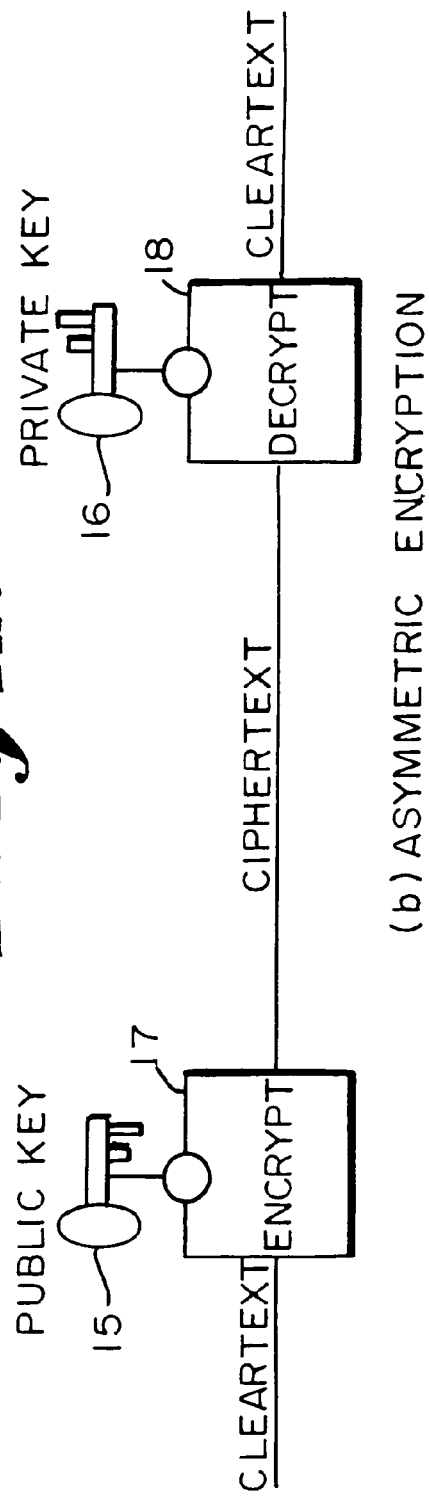
Figure 2:
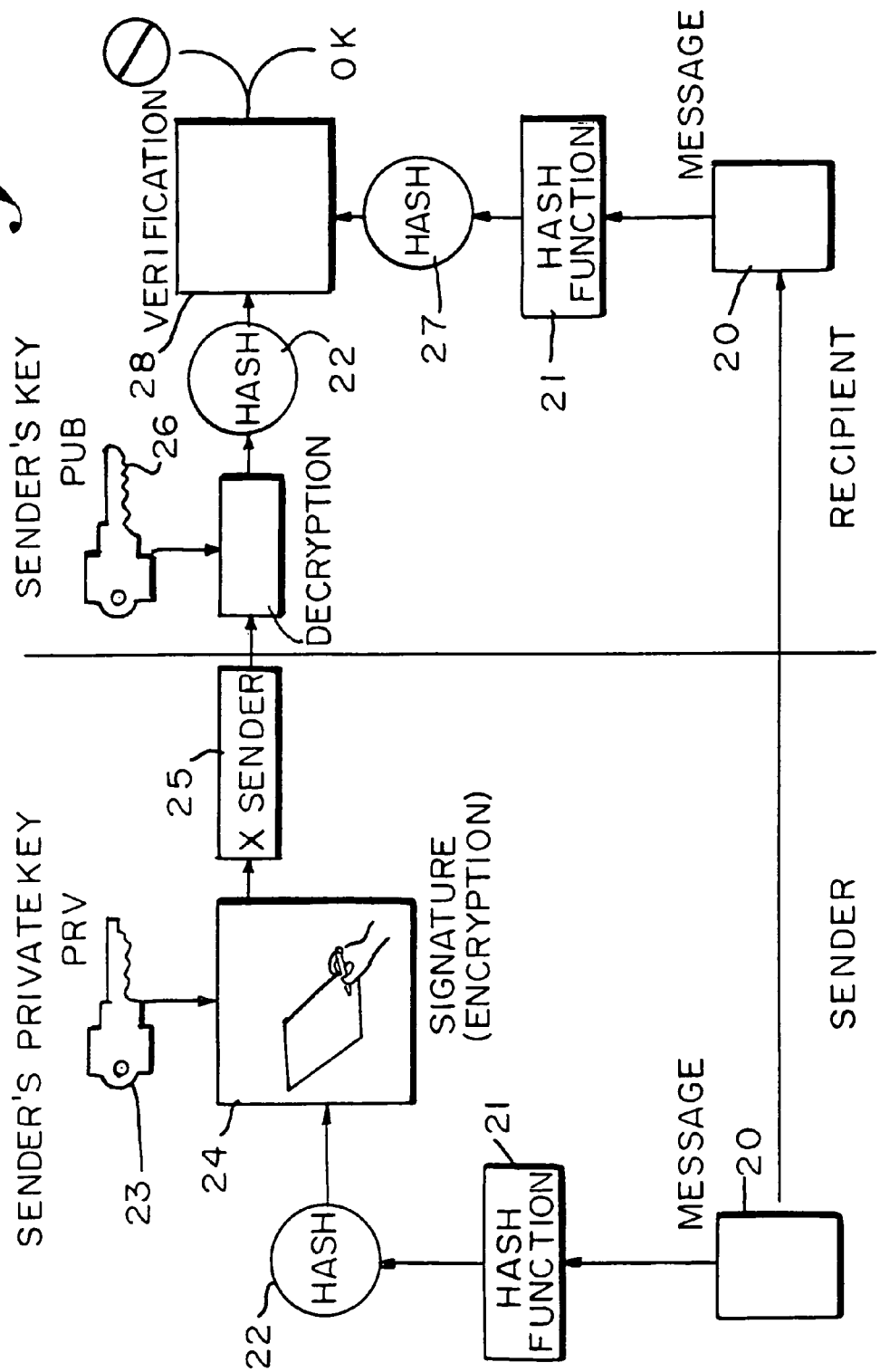
FIG. 2 is a flow chart illustrating the prior art process of a digital signature using an asymmetric encryption algorithm.

The following general principles and philosophies are reflected in the signature verification model defined in this invention. First, CA and user certificates can contain attributes that document the conditions and assumptions under which they were created. Verifiers may simply reject all certificates and transactions that do not meet their minimum standards.

Also, attribute certificates may be signed by a user's "sponsor" to signify that the sponsor's signature will be honored for official business if the transaction meets the requirements stated or implied by the attributes. Although typically the user's sponsor will be the user's employer, the model can be extended to include the user's bank, credit card issuer, voting bureau, video rental store, public library or any other entity that might accept the user's signature. This sponsor (authorization) certificate is thus the electronic equivalent of an "affidavit of legal mark," as used in the context of a traditional signature stamp. See Robert Jueneman, "Limiting the Liability of CAs and Individuals Regarding the Use of Digital Signatures," presented to the ABA Section of Science and Technology Certification Authority Work Group, Jul. 2, 1993.

Furthermore, industries may develop "industry policy" statements that establish minimum requirements for signature verification. All participants would sign these multilateral agreements in order to ensure that all counterparties would be bound by the encoded restrictions. Normally, sponsor certificates should be required in all cases, and digital signatures would be deemed otherwise null and void in their absence. Industry-wide policies would also define (1) relevant document types and classes, (2) signer roles and titles, and (3) coded symbols for incorporating by reference standard contractual terms and conditions.

Moreover, there must be strict adherence to the principle that all restrictions can be enforced in an entirely automated manner (that is, verification "on sight"), without reference to paper agreements or human interpretation, sometimes also termed "fully machineable straight-through processing." In complex; and/or high-volume environments, this is required in order to give these security controls credibility in the eyes of audit and legal experts. Reference to trusted third parties should also be minimized to reduce verification latency times.

While these restrictions seem complex, they merely reflect ordinary business procedures made explicit for purposes of machine verification. Formerly, such controls were enforced inside the sponsor's computer systems before sending out the transaction. However, with the advent of multilateral distributed transactions, the verifying user is typically off-line from the sender's sponsor's system, and so the verifier must enforce the sponsor's authorization model, as reflected in the attribute certificates. Once this methodology is specified, office software vendors will develop menu-driven systems to create and manage user attributes, and the cost to user organizations will be relatively low.

Organizational Structure in Certificates

The certificates themselves may reflect the structure of a sponsor organization. Because many authorization decisions are based on the user's position in an organization, the organizational structure and the user's position therein may be specified as part of a user's name. Names in certificates are specified in terms of the X.500 Directory model, as follows.

Figure 4:
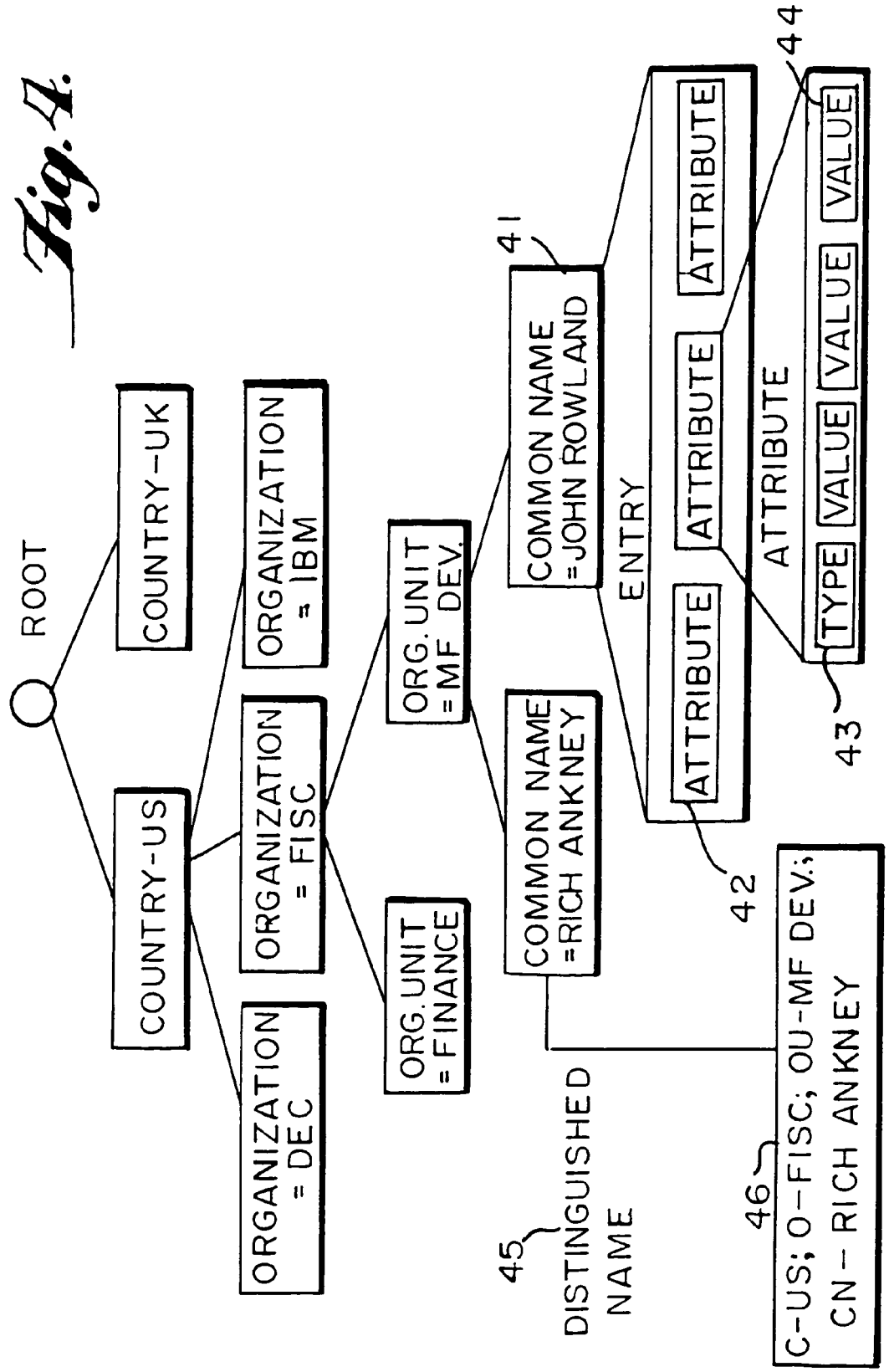
FIG. 4 shows a directory information tree (DIT)

The X.500 Directory structure is hierarchical; the resulting distributed database comprises the Directory Information Tree (DIT), as shown in FIG. 4. Each entry 41 is of a specific object class and consists of a set of properties called attributes 42. An attribute 42 consists of a type 43 and one or more values 44. Thus, in an entry of class organization, one attribute is the organizationName; in an entry of class organizationalPerson, attributes might include title and telephoneNumber.

Each entry also has one or more special attribute values used to construct the object's name; this attribute value is the relative distinguished name (RDN) of the entry. An object's distinguished name (DN) 45, which is created by concatenating the relative distinguished names 46 of all entries from the DIT root to the entry, uniquely identifies the object in the global DIT.

Several of the attributes defined in X.500 may be usefully included in the user's attribute certificate. For example, the object class can be used to distinguish between entities (for example users and roles) whose distinguished names are of the same form. Also, the title may be used in making authorization decisions.

In addition to the use of the DIT to group entities along organizational lines, X.500 defines several object classes that can be used to construct arbitrary groups of entities. These object classes include the organizational role, whose "role occupant" attribute lists the names of the users who occupy the role, and the group of names, whose "member" attribute lists the names of group members. To convey this information in a trusted way, one could define role and group certificates that convey the names of the role occupants or group members, respectively, and that are signed by a CA, thus enabling use of this feature outside the context of an X.500 directory system.

Group and role certificates may be used in conjunction with a cosignature mechanism to simplify the construction of cosignature requirements. For example, a transaction might require the signatures of three occupants of the "purchasing agent" role. A user may also indicate the role in which he is acting by including the role in the signature computation as a (per-signer) signature attribute. The asserted role may then be matched against a role certificate (or the user's attribute certificate) during verification.

Policy Information in Certificates

It is another embodiment of this invention to encode information regarding a CA's security policy into the attribute certificates of the CA and its subscribers, so that the verifier of a signature can use the information in determining whether to accept a, signature as valid. In general, the CA's certificate, will convey the rules that a CA uses when making certification decisions, while the user's certificate will convey the information used by the CA when applying these rules.

Attributes in CA certificates can indicate security policy and assurance information for a particular CA. This policy information can also be inherited by subordinate CAs, allowing easy construction of security domains sharing a common policy. Policy attributes in a CA's certificate might, among others, include:

(1) Liability Limitations: the extent to which a CA is liable in the event of various problems (for example, CA key compromise, defective binding); this might be no liability, full liability or a specific monetary amount.

(2) Trust Specification: a description of which; users and CAs a given CA can certify, expressed relative to the CA itself (for example, "all subordinates"), or to the DIT in general (for example, "the subtree below Organization ABC"), or to others.

(3) Required Attributes: a list of those attributes in the user's attribute certificates that must be verified against a transaction and/or its context in order for the transaction to be considered authorized. These attributes would be found in the certificate(s) of the sponsor and allow a single authorization certificate to contain authorization attributes for use with multiple applications. Some suggested user authorization attributes are defined later.

(4) Allowable Name Forms: a specification of the allowable name forms that the CA may certify. This information is held as (a) a set of name bindings, which defines the attributes that may be used to name entries of a given object class (that is, the allowable RDN formats for entries of that class), and (b) a set of structure rules, which defines which object classes may be adjacent (that is superior or subordinate) to each other in the DIT, that is, the order in which object classes may be chained together to form a complete DN. This policy attribute may be used to restrict the type of entities that may sign transactions. For example, for wire transfer applications, it might be desirable to restrict signature capability to the organization itself, rather than to users within the organization, since this is similar to the current mode of operation using DES MACs.

(5) Cross-Certificates: it may be desirable from an efficiency point of view to allow certifying entities and as organizations to cross-certify each other in order to constrain the length of certification paths. On the other hand, it is not desirable to allow certification paths to contain arbitrary numbers of cross certificates, as it is difficult to determine the level of trust in the entity at the other end. Many certification architectures restrict certification paths to contain only one cross-certificate. To accommodate a wider range of policies, an attribute may be added to the attribute certificate associated with the cross-certificate indicating that the cross-certifier explicitly allows the use of cross-certificates issued by the CA being cross-certified.

Attributes in a user's or entity's attribute certificate may represent the information verified by the CA when creating the certificate for the entity. Policy attributes in a user's certificate might, among others, include:

(1) Binding Information: the criteria used to bind the public key to the identity of the entity being certified. This includes (a) the method of delivery, such as being presented in person, by authorized agent, by mail or by another method; (b) the method of identification, such as by reasonable commercial practices, verified by trusted third party, dual control, fingerprint check, full background investigation or another method; (c) the identification documents presented to the CA; and (d) the subject's entity type, that is, individual, corporation, device or other.

(2) Trusted Third Parties: the names of any trusted third parties or agents involved in the binding process.

(3) Roles: it may be useful for authorization purposes to indicate which roles (both internal and external to the organization) a user may exercise. This is in contrast to a role certificate, which would be issued to the role and contain the names of all occupants.

(4) Relative Identity: a CA may wish to certify only a portion of the DN of an individual. In particular, the CA might disclaim liability for correctness of an individual's personal name, since, under legal Agency principles, the individual's signature is binding on their organizational sponsor in any event. Consider the name:

C=US; O=Bankers Trust; OU=Global Electronic
Commerce; CN=Frank Sudia; TI=VP

The CA might certify only the validity of the organization, organizational unit and title portions of the individual's distinguished name, all of which are easy to verify, while the personal name would only be "reasonably believed accurate." In view of the relative ease of obtaining false identity papers, this avoids the need for prohibitively expensive background investigations. Such an identification can be relied on in an ordinary commercial setting but not in a proceeding concerning a will or inheritance, for example.

(5) Absolute Identity: we define relative identity as the user's identity "relative" to his organizational sponsor. Put another way, we certify all elements of the user's "business card identity," except his personal name. As a special case, some CAs might undertake to certify the absolute identity of selected users, say the children of wealthy clients, diplomats or national security operatives, almost certainly bolstered with biometric techniques. This would be rare and is presented here only for completeness in order to round out the "relative identity" concept.

Authorization Information in Certificates

Attributes may convey restrictions that control the conditions under which a signature is valid. Without such restrictions, the risk of forgery would be considered excessive, since an electronic signature can be affixed to almost any digital document by anyone possessing the user's smart card and personal identification number (PIN). In the electronic environment, the normal contextual controls of document creation and physical delivery are either weak or nonexistent.

Figure 5:
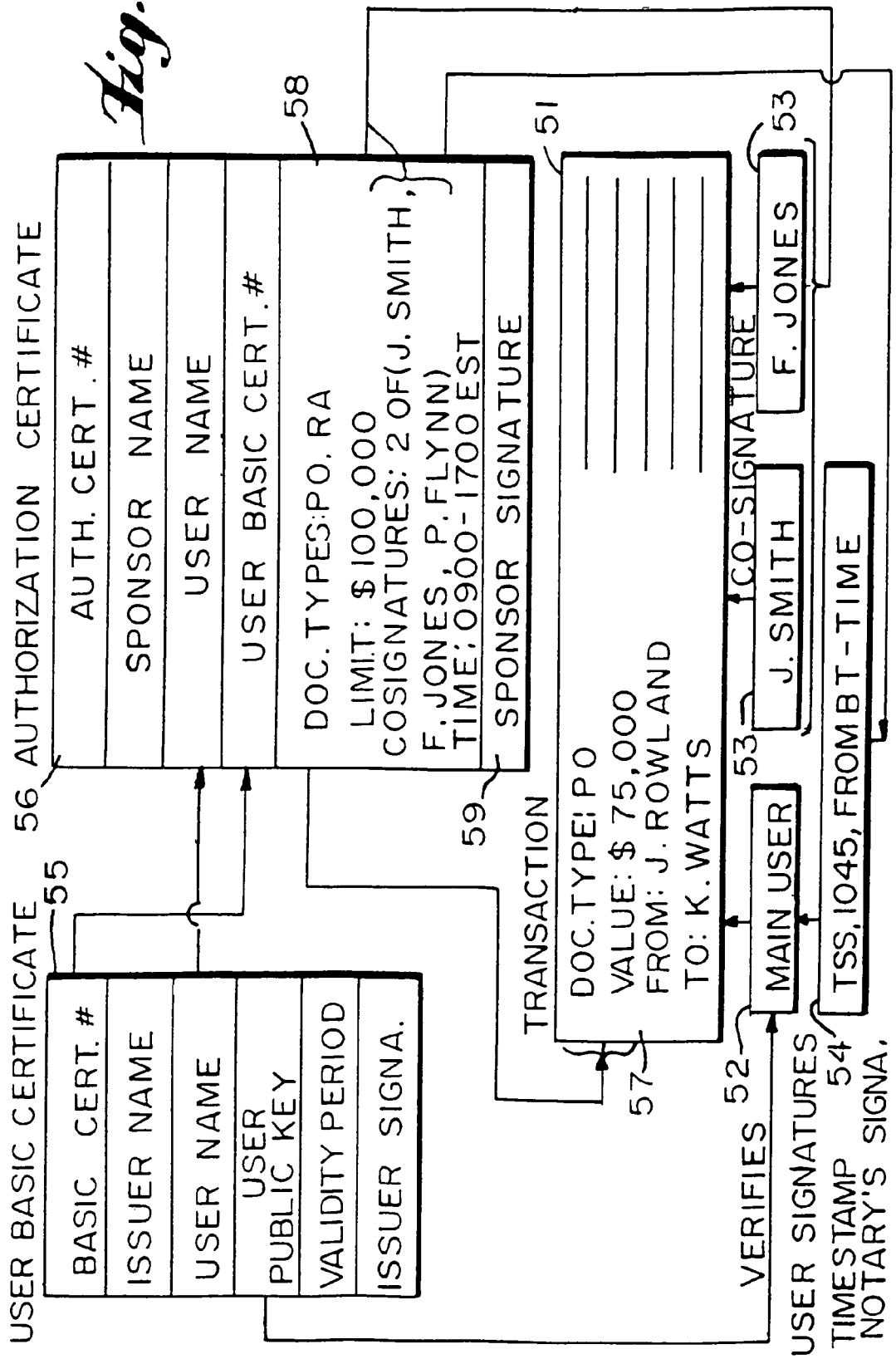
FIG. 5 shows an example of an authorization certificate.

Even authentic users are hardly trustworthy to undertake free-form offline commitments, and organizations will thus welcome the capability to positively restrict the scope of express signature authorization. Such authorization attributes might, in addition to standard X.500 attributes, include Transaction Limits, Cosignature Requirements, Document Types, subject matter restrictions, Authorized Signatories, Geographical and Temporal Controls, Age of Signature, Pre-approved Counterparties, Delegation Controls, and Confirm-To Requirement. These attributes can be encoded in one or more authorization certificates signed by the signer's organizational sponsor or by an external CA acting on behalf of the organization. An example of an authorization certificate and an associated transaction is shown in FIG. 5.

When a recipient user (verifier) receives a transaction 51 from a sending user, the recipient first uses the sender's basic key certificate 55 to verify the sender's signature 52 on the transaction 51. As will be described in greater detail below, the recipient also uses the sender's authorization certificate 56, signed by the sender's sponsor 59, to verify the cosignatures 53 and timestamp notarization 54 appended to the transaction 51 and to verify that the attribute values 57 of the transaction 51 fall within the authorized attribute values 58 as specified in the authorization certificate 56.

Figure 6:
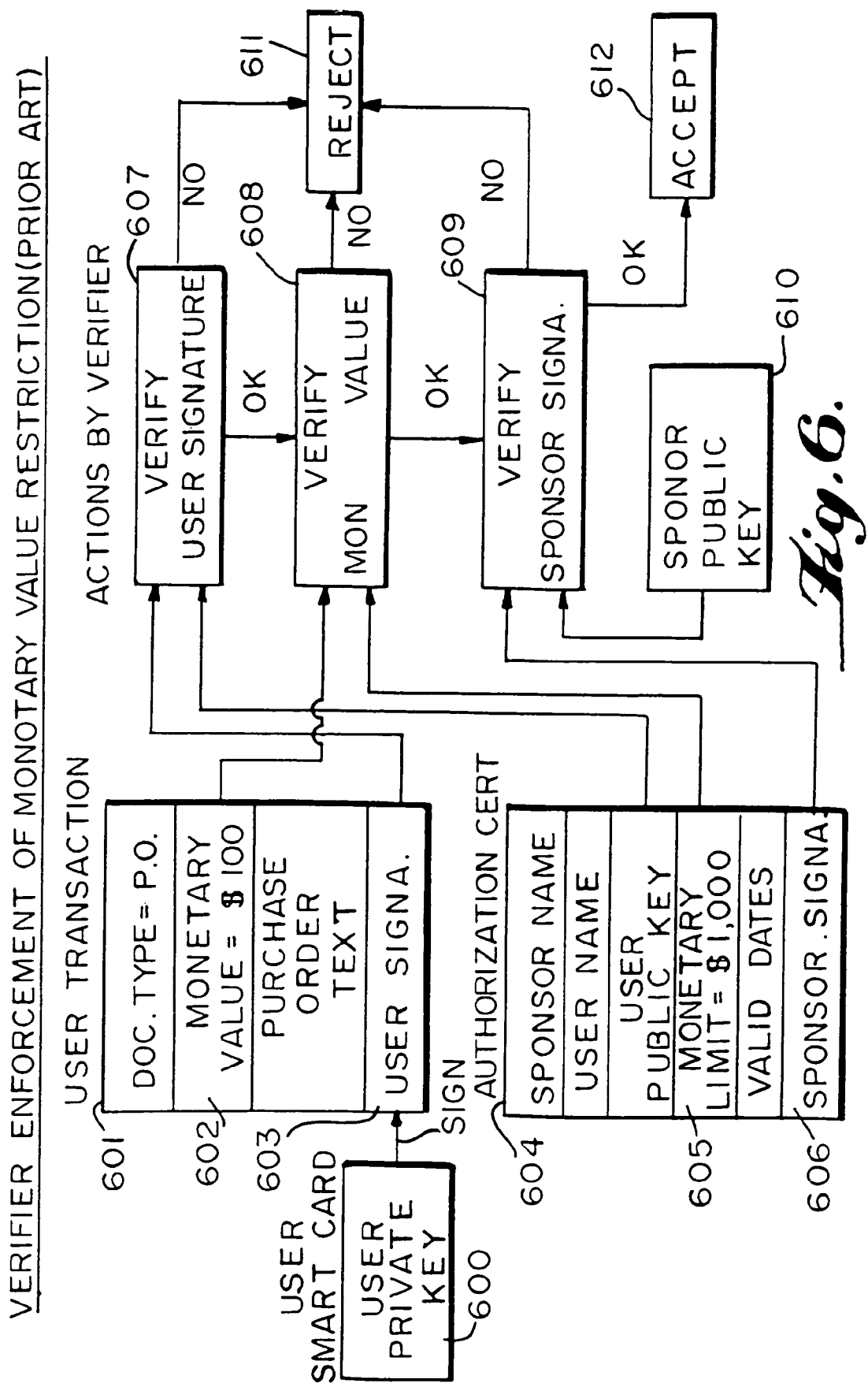
FIG. 6 is a flow chart illustrating the prior art process of verifier enforcement of a transaction monetary value restriction.

The user may be subject to transaction limits that control the value of transactions or other documents that the user may initiate. The user's signature will be valid only on transactions originated either up to a certain monetary limit or between two monetary value boundaries. Accordingly, as shown in FIG. 6, the sending user sends a transaction 601 signed 603 by the sender (actually by the user's smart card 600 containing his private key) and appends thereto an authorization certificate 604. The verifier uses the authorization certificate 604 to verify 607 the user's signature 603 and to verify that the transaction monetary value 602 falls within the transaction limit attribute value 605 in the authorization certificate 604. The verifier also verifies 609 the sponsor signature 606 on the authorization certificate 604 using the sponsor's public key 610. If any of these signatures and attribute values does not verify, the transaction is rejected 611. If verification is complete, the transaction is accepted 612.

Figure 7:
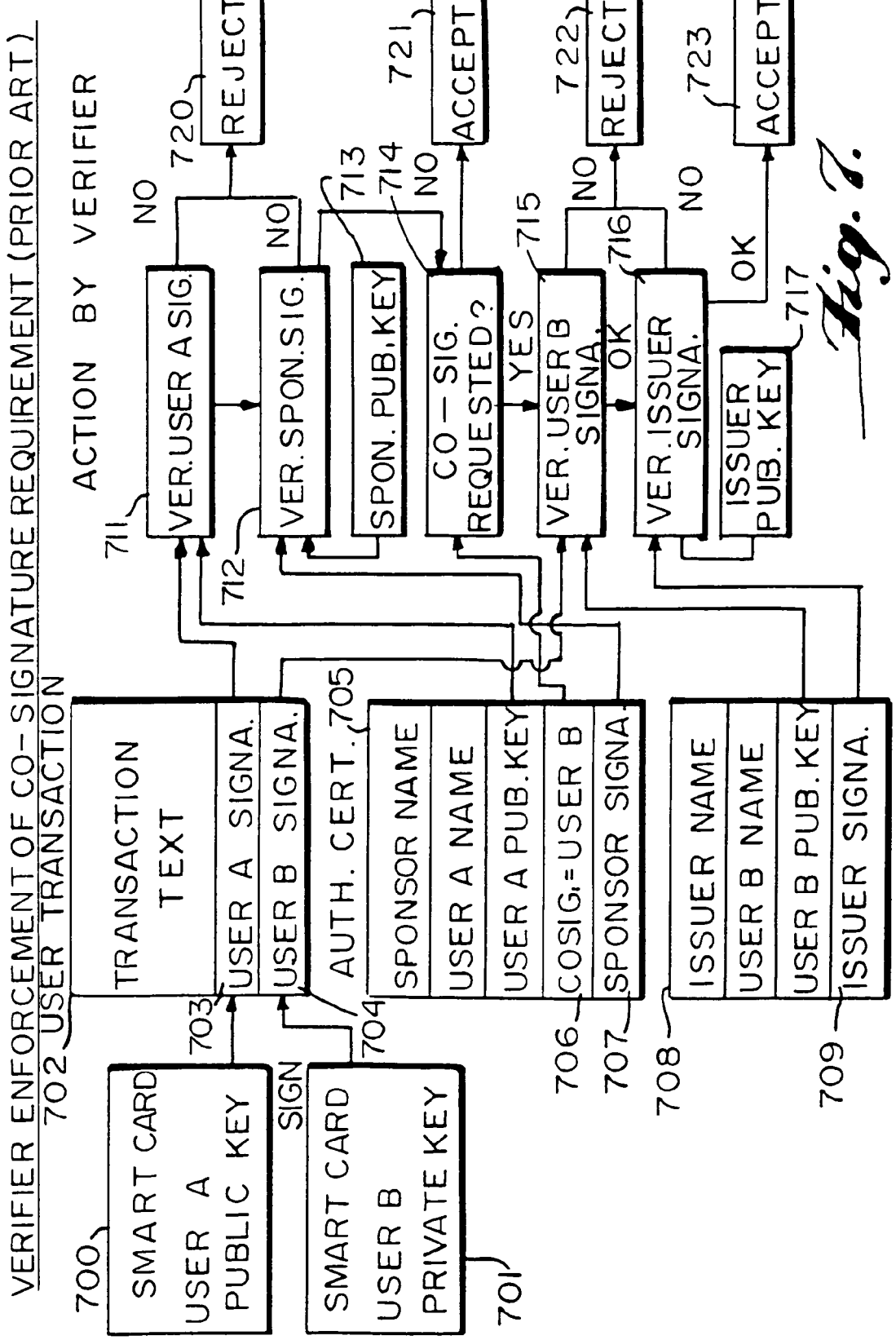
FIG. 7 is a flow chart illustrating the prior art process of verifier enforcement of a transaction cosignature requirement.

With regard to cosignature requirements, additional signatures may be required in order for a given signature to be considered valid. Quorum and weighting mechanisms can be used to construct fairly elaborate checks and balances for explicitly governing the level of trust in each user. The particular sequence or order of required signatures may also be specified. Referring to FIG. 7, sending user A sends a transaction 702 signed 703 by his own smartcard 700 and, if user B's cosignature is required on the transaction 702, signed 704 by the smartcard of user B 701. Sending user A also appends his own authorization certificate 705 to the transaction 702. The verifier uses the authorization certificate 705 to verify 711 user A's signature 703, and uses the sponsor's public key 713 to verify 712 the sponsor's signature 707 on the authorization certificate 705; if either signature does not verify, the transaction is rejected 720. If a cosignature value 706 is required 714 by the authorization certificate 705, the recipient enforces the requirement by verifying 715 cosigner user B's signature 704 on the transaction 702, and then checks cosigner user B's public key certificate 708 by verifying 716 the signature 709 of the certificate issuer, using the issuer's public key 717. If the signature of either user B or his certificate's issuer does not verify, the transaction is rejected 722.

The use of cosignatures allows an organization to effectively define checks and balances, and to explicitly specify the level of trust in a user. The use of cosignatures also greatly reduces the risks that result from inadvertent compromise of a private key due to theft, misuse or misplacement of a smartcard or PIN. In particular, it is believed that the ability to require cosignatures, value limits and related controls will enable organizations to carefully manage and fine-tune all signature authorizations, thereby giving them all the tools needed to manage and limit their risks. Use of cosignatures further allows distribution of the authorization function over multiple locations and hardware platforms, with the resultant minimization of risks that might result from access control failures on one of those platforms. See U.S. Pat. Nos. 4,868,877, 5,005,200 and 5,214,702.

Authorization signatures, which must meet the restrictions specified in the signer's certificate, can also be distinguished from other cosignatures by including the signature purpose as a signature attribute and by requiring that an indication of the signature purpose be included in the data being signed. This signature-purpose attribute might require the values of: (a) an authorization signature appropriate to the document, (b) an authorization cosignature appropriate to the document, where the cosigner's certificate has sufficient authority to authorize the document, and (c) a witness cosignature, where the cosigner's certificate does not by itself have sufficient authority to authorize the document. Signature purpose encodings discussed in draft ANSI standard X12.58 Version 2 (Appendix) issued by the Data Interchange Standards Association (DISA), which is well-known in the art and is hereby incorporated by reference.

The user can also be restricted to signing only particular document types, such as ordinary correspondence, purchase orders, specified EDI transaction types, business contracts, specified financial instruments, etc., as defined by industry-wide policies. It may also be desirable for efficiency to exclude certain large classes of transactions and documents. Referring to FIG. 8, the recipient enforces the document-type restriction in the sender's transaction 801 by first verifying 807 the sender's signature 803 on the transaction and by then verifying 808 the document type attribute value 802 within the transaction 801 to enforce the document type restriction 805 within the sender's authorization certificate 804. The recipient then verifies the authorization certificate 804 by using the sponsor's public key 811 to verify 809 the sponsor's signature 806. If either a signature or the attribute restriction does not verify, the transaction is rejected 810.

It is also desirable to add positive or negative restrictions pertaining to transaction subject matter or context class. For example, to restrict an agent to signing purchase orders for some class of goods (such as, for example, office supplies), or to deny authority as, for example, in the case of denying an agent the ability to purchase pornographic materials. Subject matter restrictions are enforced by the transaction recipient in the same manner as document type restrictions, and may be implicit in many document types, yet requiring separate specification for the more generic document types.

An organization can indicate that there are specific authorized signatories, that is, that only specific individuals can "sign for" the organization, similar to a standard "corporate resolution" to this effect. This might complement the document-type concept, as an additional control on signing of "corporate" document-types. This restriction can be implemented by specifying that a cosignature is required in which the cosigner's title (in its distinguished name) must be equal to one on a specified list contained in a authorization certificate. This is in lieu of naming a list of one or more required cosigners.

Figure 9A:
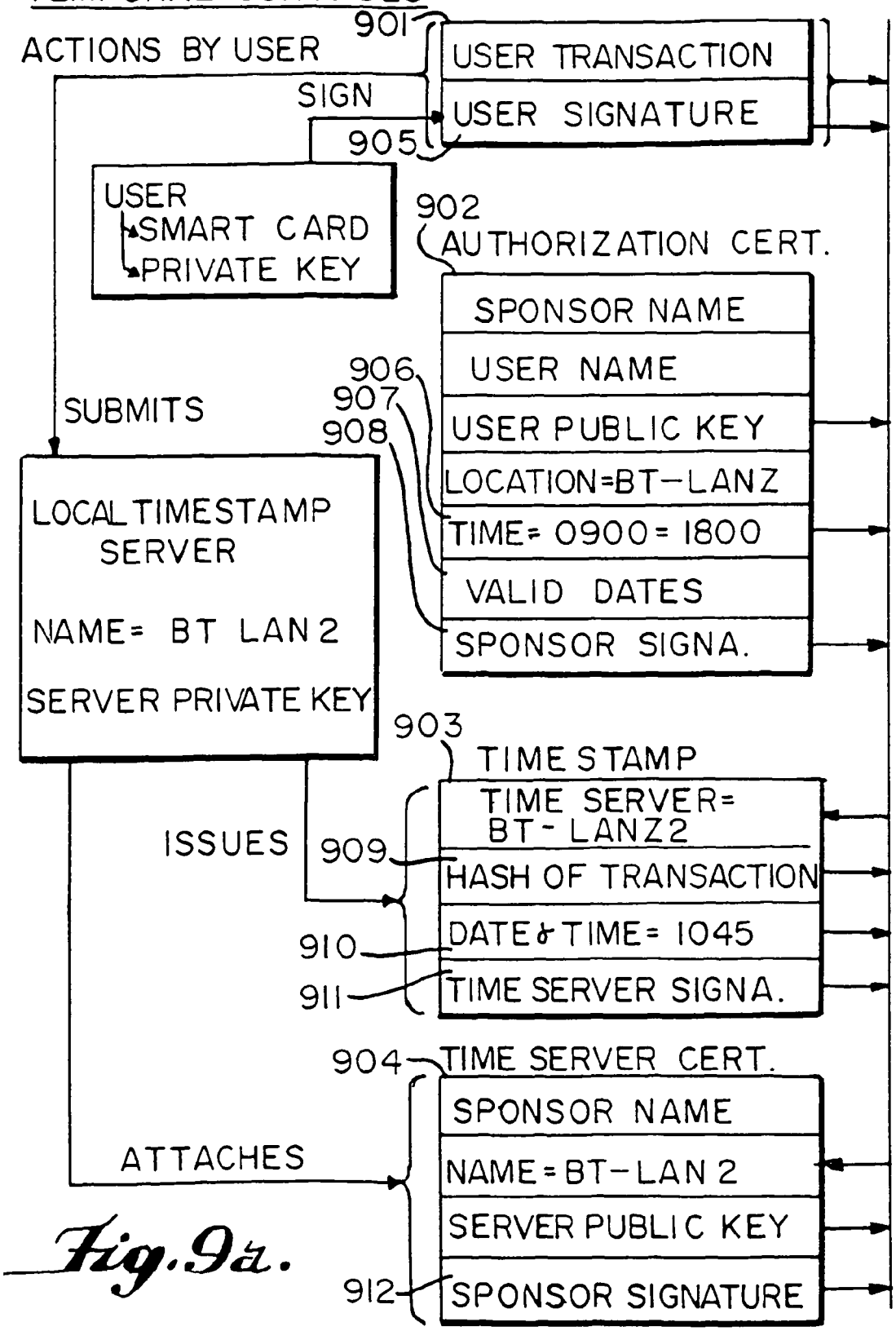
FIG. 9 is a flow chart illustrating the process of verifier enforcement of a transaction geographical and temporal control.
Figure 9B:
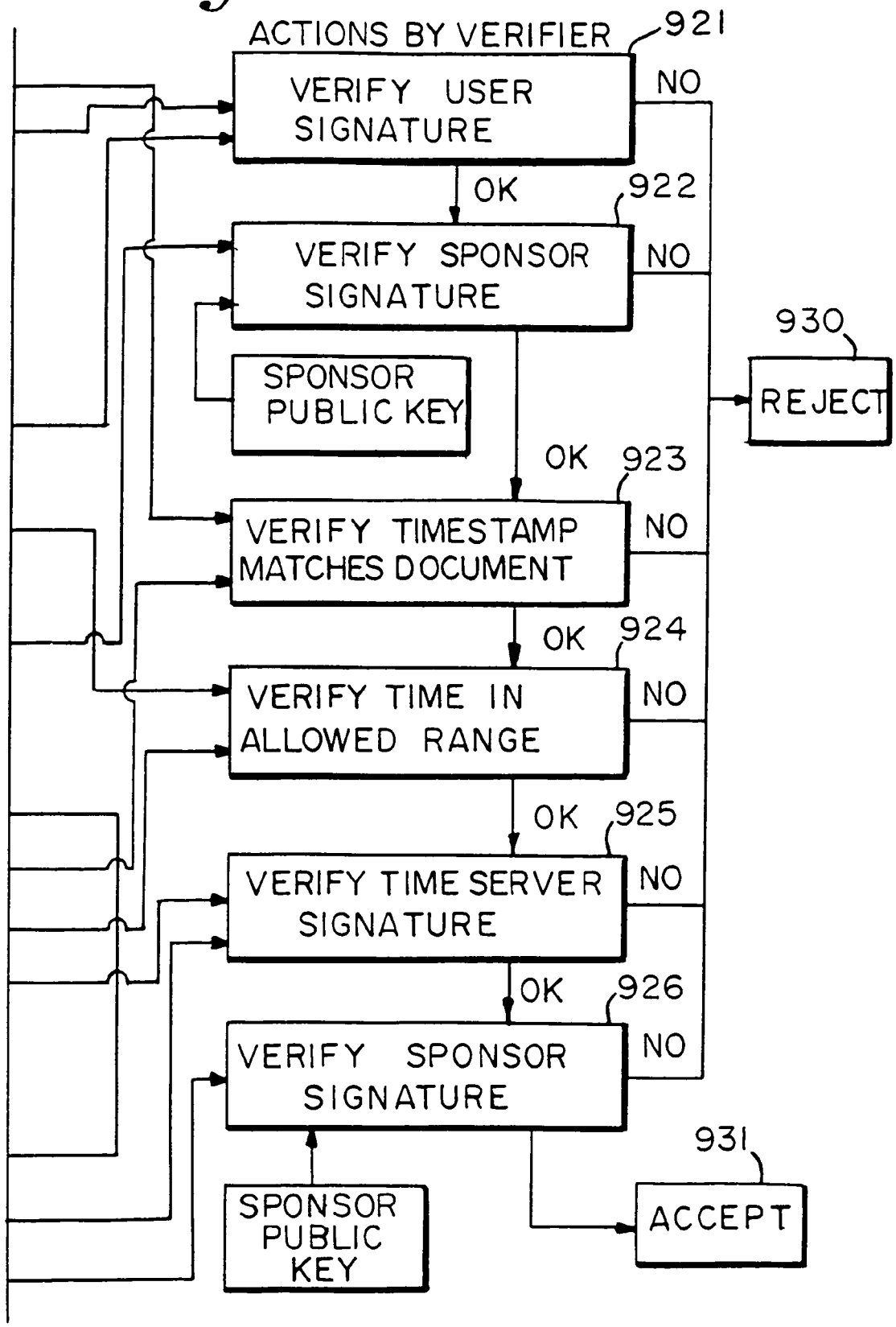

Geographical and temporal controls include locations and time periods from which transactions are considered valid. Use of a local trusted "timestamp notary" is assumed. Such a notary would append a trusted timestamp to the originator's signature on a document and would then sign the result. Thus, time-of-day and day-of-week restrictions would normally coincide with the work-week of the user's locale. Also, location information would be associated with the notary so as to restrict access to a specific network segment, typically the user's assigned work area. The "granularity" of location controls would depend on the network architecture. The signer or the signer's computer system must attach a certified timestamp from a specified local server to the transaction, or else the verifier cannot accept the transaction and the signer's sponsor will not be bound by it. As shown in FIG. 9, the sending user attaches to the transaction 901 an authorization certificate 902, as usual, an authorized timestamp 903 and a time server certificate 904. The recipient verifies 921 the sender's signature 905 on the transaction 901 and verifies 922 the sponsor's signature 908 on the authorization certificate 902. The recipient then (1) verifies 923 that the timestamp transaction text hash 909 matches the result of the text of the transaction 901 hashed with a known hash function, (2) verifies 924 that the time and date 910 on the transaction timestamp 903 fall within the authorized time and date 906 attribute values as specified in the authorization certificate 902, (3) verifies 925 the time server signature 911 on the timestamp 903, and (4) verifies 926 the sponsor's signature 912 on the time server certificate. If all these conditions are satisfied, the transaction is accepted 931; if not, the transaction is rejected 930.

Figure 10:
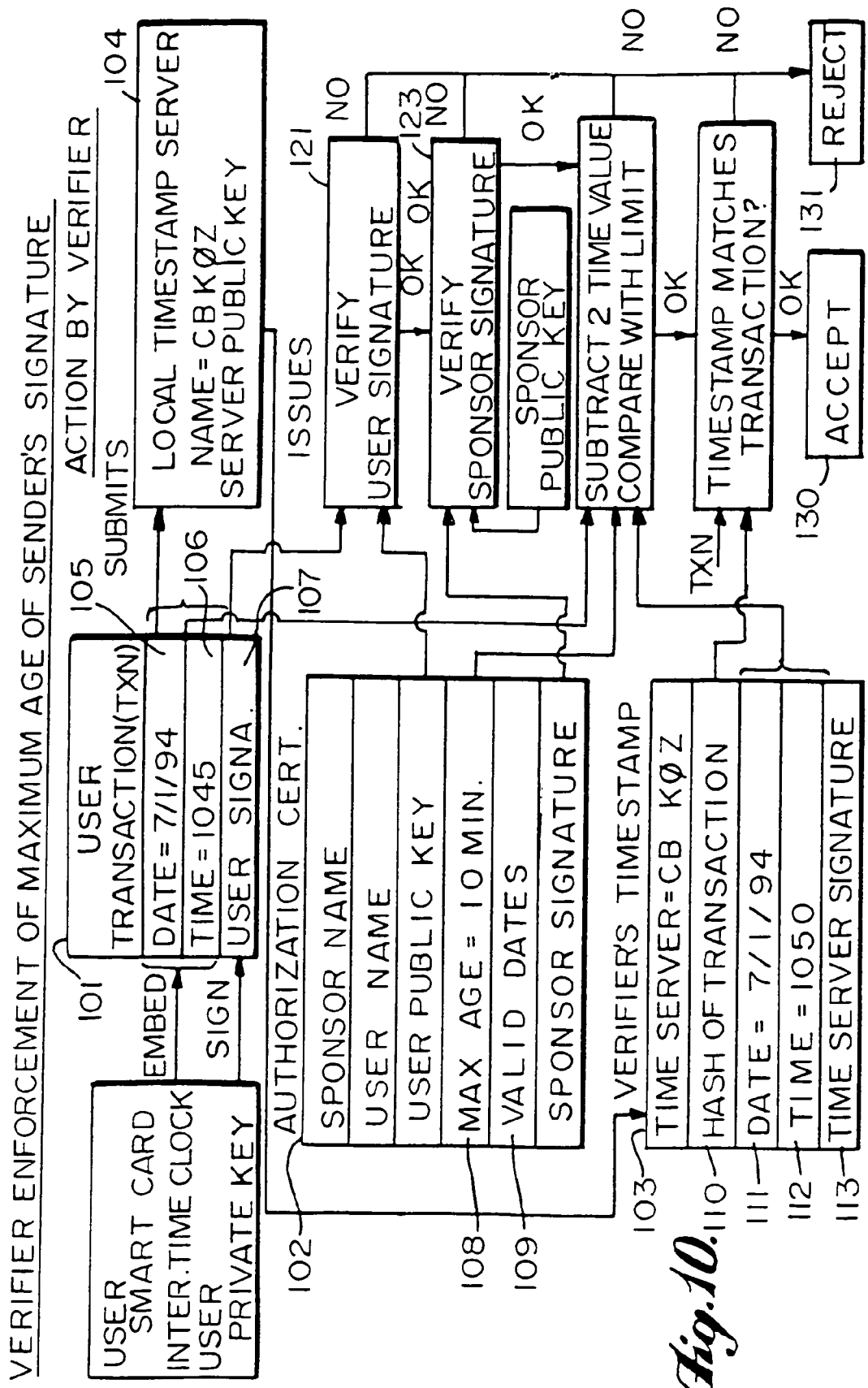
FIG. 10 is a flow chart illustrating the process of verifier enforcement of a maximum age of sender's signature restriction.

Furthermore, a document may not be valid unless the signature is verified within some specified time period. For high-value transactions this age-of-signature attribute period would be quite short, while for more normal transactions, especially those sent via store-and-forward systems such as X.400, a longer interval (such as two days) would be appropriate. FIG. 10 shows enforcement by a recipient of the age-of-signature attribute value. The time of verification would be provided using a receipt 103 signed by a trusted timestamp service 104 containing, at a minimum, the recipient's name and the signature from the original transaction. The verifier must submit a timestamped copy of the original signature that is dated promptly after the time and date of the original transaction, or else the sponsor will reject it. As shown in FIG. 10, the recipient (verifier) verifies 121 the sender's signature 107 on the transaction 101 and verifies the sponsor's signature 115 on the authorization certificate 102. The recipient then verifies 122 that the difference between the date 105 and time 106 on the transaction 101 and the date 111 and time 112 on the timestamp 103 is within the age-of-signature attribute restriction 108 in the authorization certificate 102. The recipient also verifies 123 that the hash 110 of the transaction 101 within the trusted timestamp 103 matches the text of the transaction 101. If all these conditions are satisfied, the transaction is accepted 130; if not, the transaction is rejected 131.

A similar concept is that of a minimum age of a signature. In this case the signature would not be valid until some minimum time after it had been signed. This allows for a smartcard to be reported lost and for a revocation notice to be broadcast to the recipient. The control attribute can specify a maximum and/or minimum age for the signature . . . .

A "pre-approved counterparties" attribute value restricts an entity to dealing only with some specified set of known trustworthy partners. This is a common requirement in dial-up home banking systems, which typically require that all authorized payees be specified in advance. Another way of stating this is that "free-form transfers" are forbidden. Sponsors realize that, in case of an error, they stand a better chance of successfully reversing the error when dealing with a large, solvent and creditworthy party than when dealing with a small, unknown and unauthorized one. Separate certificates can be issued for each counterparty in order to prevent a competitor from obtaining the user's customer list (other than himself) in a single certificate. The approved counterparty can be coded either as a common name, a distinguished name, a certificate number, or the hash value of either the distinguished name or the counterparty's public key. In order to claim the benefit of the transaction, the verifier must submit a certificate that matches the encoded counterparty value.

Figure 11B:
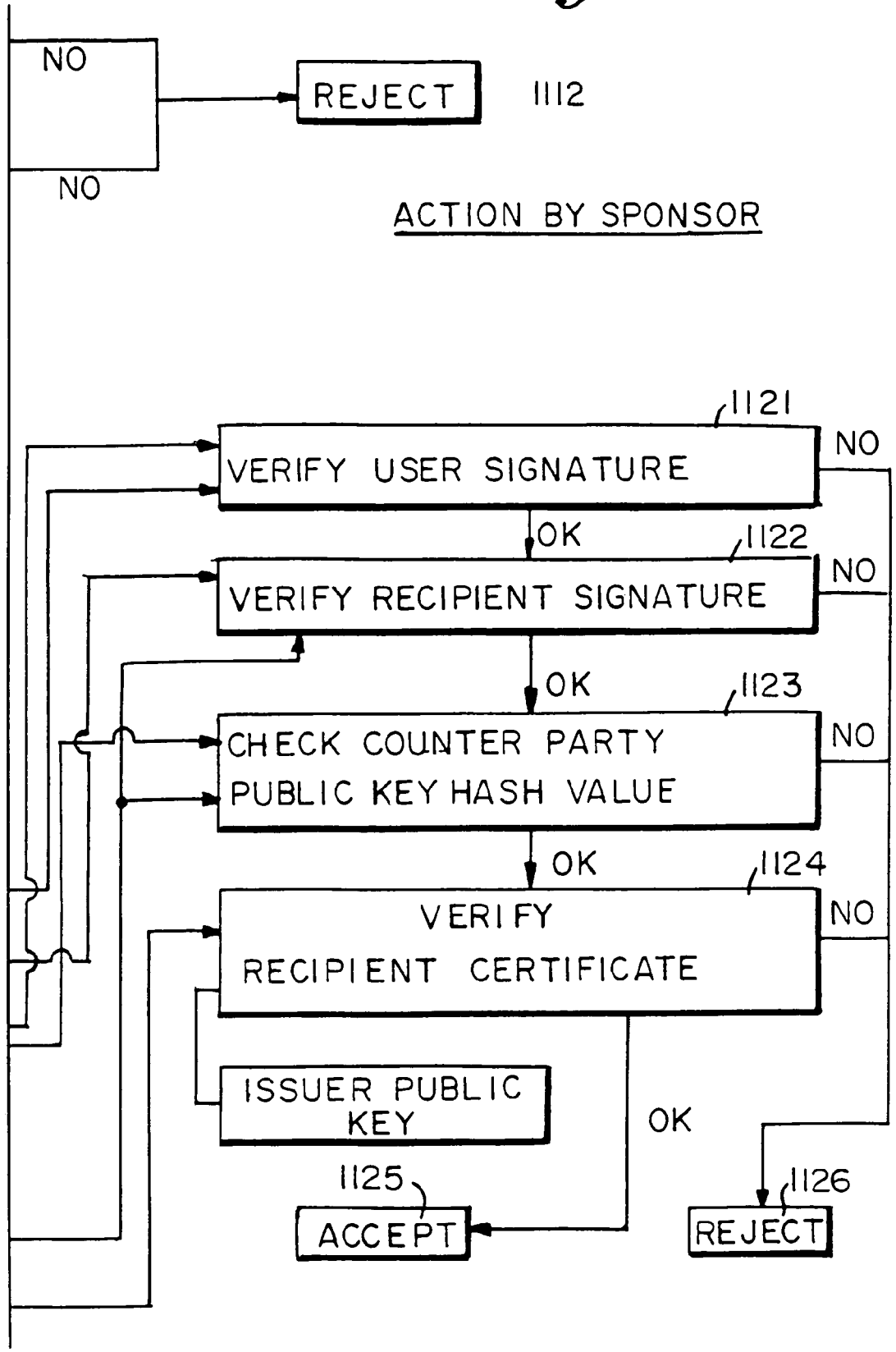
FIG. 11 is a flow chart illustrating the process of verifier and sponsor enforcement of a pre-approved counterparty restriction.

FIG. 11 shows verification by the user's sponsor of the user's transaction after receipt by a recipient. The recipient (counterparty) verifies 1110 the user's signature 1103 on the transaction 1101 and verifies 1111 the sponsor's signature 1105 on the user authorization certificate 1102. If either of these signatures does not verify, the transaction 1101 is rejected 1112. If the signatures verify and the transaction is accepted 1113 by the recipient, the recipient endorses the transaction 1101 by issuing his verified transaction 1114 counter-signing 1116 the text 1106 of the original user transaction 1101 and the sending user's signature 1103, with the recipient's certificate 1115 attached. In enforcing the pre-approved counterparty restriction in the sending user's authorization certificate 1102, the sending user's sponsor verifies 1121 the sending user's signature 1103, as included in the recipient's verified transaction 1114, and verifies 1122 the recipient's signature 1116 thereon. If these signatures are verified, the sponsor next verifies 1123 the counterparty public key hash value by hashing the recipient's public key 1117 and checking the result against one of the authorized counterparty public key hash values 1104 as specified in the user's authorization certificate 1102 (the recipient's public key 1117 that the sponsor hashes for verification is itself verified 1124 when the sponsor verifies the recipient's certificate). If these conditions are met, the transaction is accepted 1125.

The attribute values of delegation controls can limit the types and value ranges of authorizations that a CA may specify when issuing an attribute certificate. They can also serve to limit the scope and depth to which a user may delegate his signing authority to others. For example, a root CA might limit an organizational CA to issuing authorizations only to allow its end users to sign documents whose document types fall into a range of documents related to state tax administration. Or a CA might grant some authority to a user with the provision that it can be delegated only to another person with the rank of assistant treasurer or higher, for a time not to exceed thirty days, and without the right to further subdelegate.

Another authorization attribute, called a "confirm-to requirement" value, prevents the signature from being valid unless the verifier sends a copy of the verified transaction to a third party, typically the user's organizational sponsor or work supervisor, at a specified mail or network address, and either (a) receives an accept/reject message, or (b) a specified time elapses. This requirement is similar to a cosignature but occurs after the transaction is sent rather than before. Such after-the-fact confirmation could be acceptable in lower risk situations in which few transactions would be rejected and in which obtaining the cosignature of the third party in advance may be unduly burdensome. Or it might be preferred in high-value cases where positive on-line checking is demanded. In that case, the flow pattern reverts back to an on-line rather than an off-line system. As shown in FIG. 12, the recipient first, as usual, verifies 1211 the sender's signature 1203 on the transaction 1201 and verifies 1212 the sponsor's signature 1205 on the user authorization certificate 1202; if either of these signatures does not verify the transaction 1201 is rejected 1213. If the signatures are verified, the recipient sends 1214 a confirmation message consisting of the original transaction 1201 (the transaction text 1202 and the sending user's signature 1203) to the user's sponsor 1215, as specified 1204 in the sender's authorization certificate 1202. The recipient should receive from the sponsor 1215 the same message in return as confirmation 1216, but signed 1205 by the sponsor. The recipient then verifies 1217 the sponsor's signature 1220 and the confirmation message 1216, and accepts 1219 the transaction 1201.

In order to create complex combinations of restrictions, a filter expression, which is a Boolean or logical expression involving one or more attributes, can allow construction of restrictions involving multiple attributes. The attribute assertions are linked with the usual Boolean connectives: "and", "or" and "not". For example, the sponsor might restrict a user to submitting transaction with a type equal to "purchase order" and a value less than $100,000. Assertions may involve either a single attribute value (equality, less than, greater than, etc.), multiple values of an attribute (subset, superset, etc.), or the presence or absence of an attribute in the document. Of course it will be appreciated that any or any of the described restrictions, as well as others, can be in effect at the same time for the same document or transaction. These restrictions have been discussed and illustrated separately for clarity.

The use of authorization attributes allows a recipient to verify authorization as well as authentication. In such a scenario, the sponsor certificates, anchored by the sponsoring organization's certificate, would be interpreted as authorizing "on sight" the transaction to which they are applied, assuming all specified restrictions are met.

A set of basic policies must be defined for use throughout the financial services industry and other industries in order to provide a well-defined, predictable level of service for the verification process. These policies would be agreed to on a multilateral basis by every participating firm and could stipulate that certain of the restrictions and authorizations discussed in this section would always be deemed to be in effect unless expressly provided otherwise. One of the more important elements of these industry agreements would be the definition and coding of document types. This must be done on a per-industry basis, since the rules will obviously be much different, for instance, for customs inspectors, aircraft inspectors, auditors, tax officials, etc.

Certain authorization attributes may pertain to the specific content of the document itself. This can pose problems for automated machine verification, because the verifier's computer may not always be able to determine the values of such attributes for a given document or transaction. Examples include monetary transaction limits, document types, and security or confidentiality labels. Therefore, it is desirable to provide a standard data block, preferably at the start of the document or the transaction, clearly encoding the attribute, for example the stated monetary transaction value, document type or security sensitivity label. This document tag will be appended by the signer's computer for the convenience of the verifier and as an aid to the verification process. However, in the event of a conflict between the tag and the actual content of the document, the language of the document would be controlling. In the case of structured transactions, such as EDI transactions, in which the document types and monetary values are already completely machine readable, document tags would not be needed.

As a possible convenience in processing simple authorizations, especially where a given user signs many similar transactions, it may often be helpful to copy the user's public key out of his basic authentication certificate and include it as another attribute in an authorization certificate. This permits the authorization certificate to serve both purposes (authentication and authorization) and allows the sender to omit the basic authentication certificate from each transaction. In addition, where a device is being relied upon to fulfill a given condition, it may likewise be advantageous to copy the user's device public key into the authentication or authorization certificate as well, further eliminating the need to send the device certificate with each transaction.

Third Party Interactions

Additional, useful features of digital signatures, beyond those that can be provided using attribute certificates, involve interaction between a signer and third parties of various types.

One such use for digital signatures is electronic notarization. As discussed above, there will be a need to cosign documents using a third party that is trusted to provide an accurate timestamp and/or location information. Simply relying upon signature originators to provide this information in an accurate fashion leaves signatures vulnerable to fraud based on, for example, pre- or post-dating of documents. An electronic "notary" would be trusted by virtue of its CA's policies to provide this information correctly. The multiple signature capabilities already assumed can be expanded to provide a framework for this service.

For notarization purposes, timestamps and location information will be included as signature attributes. Individual signature structures may either be detached and stored or, if desired, conveyed separately from the document.

Multiple signatures or joint signatures on the document itself can also be distinguished from "countersignatures," which are signatures on the signature structure in which they are found and not on the document itself. A countersignature thus provides proof of the order in which signatures were applied. Because a countersignature is itself a signature structure, it may itself contain countersignatures; this allows construction of arbitrarily long chains of countersignatures. Electronic notarization would then consist of countersigning the originator's signature and including a timestamp within the information being signed. For very high-risk applications it may also be desirable to require multiple signatures on each certificate by one or more CAs, with the signatures being performed in independent cryptographic facilities and with different private keys.

Various levels of service can be defined for electronic notaries based on the level of data verification performed prior to signing (ranging from mere existence of the document, in which case notarization may be completely automatic, to human verification of document content) and based on data retention and audit capabilities.

Another use for digital signatures is for delegation or "power of attorney" certificates. Because users are often tempted to entrust their devices or smartcards to others, for example, secretaries or co-workers, when the users go on vacation, the frequent situation, in which one user obtains another user's smartcard and PIN, exposes the smartcard to possible misuse. The system therefore facilitates the issuance of power of attorney certificates that allow a delegate to associate the signature of his own smartcard with the authority of the delegating user. The power of attorney certificate would include at a minimum the name of the delegator, identification of the delegate's public key certificate and a short validity period, and would be signed by the delegator. Another possibility is for the delegate to create a new key pair exclusively for use with the delegator's signature, with the new public key included in the power of attorney certificate. This would eliminate any potential confusion between use of the delegate's private key on behalf of the delegator and on his own behalf.

The problem of handing over smart cards can be greatly reduced by providing a workable alternative that preserves the principle of individual accountability. Wide implementation of this feature will make practical the disallowance of smartcard loans, a highly desirable goal.

The use of delegation certificates discussed above implies that the user is acting as a CA. In some cases, particularly those in which the transaction crosses organizational boundaries, there may be concern that the level of controls and auditing available with the individual user's cryptographic device (for example, a smart card) is not sufficient. In such cases, delegation certificates could be issued by a CA upon request of the delegator as normal authorization certificates. This also allows the delegation certificates to be revoked using the standard CRL mechanism. Users' certificates might then indicate a list of possible delegates, and the delegation certificate itself would contain an attribute naming the delegator.

In exercising the power of attorney, a user may indicate that he is signing for another user by including in the document or transaction a "Signing-for" signature attribute, that is, the name of the user being signed for. There must be a valid delegation certificate authorizing the signer to act for the user being signed for. Delegation is also useful in connection with a cryptographic module in a user's personal computer. Hashing and signing a document should ideally be a unitary operation in order to prevent substitution of a false hash via software hacking. However, the typical smartcard lacks the computing power to hash a very long document. One solution is to let the smartcard delegate this function to the cryptographic module using a very short-lived delegation certificate valid for only a few minutes. This certificate is signed by the user's smart card and indicates that the user of the smart card has allowed the delegation. See, for example: Gasser, M., A. Goldstein, C. Kaufman and B. Lampson, "The Digital Distributed System Security Architecture," Proceedings of the 12th National Computer Security Conference, 1989; Gasser, M. and E. McDermott, "An Architecture for Practical Delegation in a Distributed System," Proceedings of the 1990 IEEE Symposium on Security and Privacy.

Non-Public Public Key

A more basic problem, however, is ensuring that all possible recipients will actually employ the certificate- and attribute-verification methods described above. Although these methods allow sponsoring organizations to protect themselves, their users and those with whom they transact from liability based upon falsified transactions by allowing them to verify the identity and qualifications of those with whom they transact and the characteristics of the transactions prior to transacting, there is no guarantee that all recipients will actually so verify. If a recipient acts upon a transaction without first verifying the attributes of both the sender and the transaction, and if the sender is later found to have sent a fraudulent or unauthorized transaction, the recipient could then claim liability from the sender or its sponsor by claiming that the recipient was unaware of any requirement for authorization verification of the user's basic signature. One way to ensure that sponsors and other entities are protected from liability in such a situation is to require that the signer include the hash value of each of his identity and authority certificates as attributes within his signature. This can prevent a verifier from claiming that he was unaware of such certificates and of the restrictions they impose. However, the signer might (intentionally or unintentionally) omit to do this. Another more emphatic way to ensure verifier compliance is to prevent the root key, the public key of the ultimate authority, that is, the highest-level certifying authority, which key would-be verifiers will need in order to verify any part of a transaction, from being distributed to a user (or to the user's device or smartcard) unless the user contracts with the cryptographic system and agrees to verify all parties and all transactions in accordance with the preestablished rules. In this way, the users are not technically forced to verify all parts of their transactions. However, not verifying their transactions in full would violate the contract between the users and the cryptographic system and would thereby absolve all other parties to the cryptographic system, for example a sponsor whose employee acted without authority, from liability. The non-verifying recipient would then bear all the risks of such an unverified transaction himself. Furthermore, because the root key of the system authority is considered a trade secret, no one who has not signed the system rules agreement may possess a copy of it, and no one could claim to have verified any part of the transaction. This would make it far more difficult for the "outside" verifier to claim that he had incurred a loss by "reasonably relying" on the transaction, even if it was in fact valid. This art of keeping the system root key as a trade secret lends particular force and effectiveness to all the restriction and authorization methods described herein. It is believed that the possibility of incurring the potentially-large liability for valuable transactions will persuade users to employ the methods of attribute verification of this invention.

Restrictions on Certificate Distribution

Users and organizations must be able to restrict the distribution of all types of certificates for a number of reasons. First, the certificates often contain confidential business information that the user or organization prefers not be shared with others and that is nevertheless being shared with the verifier through the certificate, albeit only for the limited purpose of signature verification. Also, users' basic privacy rights may be violated if their public keys and network addresses are published. For example, they may be flooded with unsolicited business proposals and advertisements once their public keys are disseminated. Furthermore, the organization may have a general policy against giving out user identification numbers and public keys, because they may be used as starting points for various types of security attacks.

This functionality may be implemented as an attribute in user's certificate. If the "distribution-restriction" attribute is TRUE, the user/issuer grants permission to use the certificate (which could be an authority or a public key certificate) only for signature verification; distribution or further publication is prohibited. Other ways to specify this restriction might include placing the attribute in the organization's certificate, publishing the restriction as part of the industry-specific policy, or (in a true X.500 implementation) using the X.500 access control list mechanism to restrict access to the certificate. Although some existing general legal basis for enforcing this restriction might be found under copyright law, that is, if the certificate is declared as an unpublished work for which a license is granted only to the named verifier, a firmer legal basis will still be desirable.

Smartcard Requirements

There are some additional requirements on smartcards when used with commercial digital signature systems.

The first requirement is private key confinement and self-certification. That is, the user's private signature key must never be allowed to leave the smart card. Only in this way can it be assured that theft of the key cannot be accomplished through purely electronic means without leaving any evidence. This principle of private key confinement is vital to the concept of non-repudiation.

Figure 13:
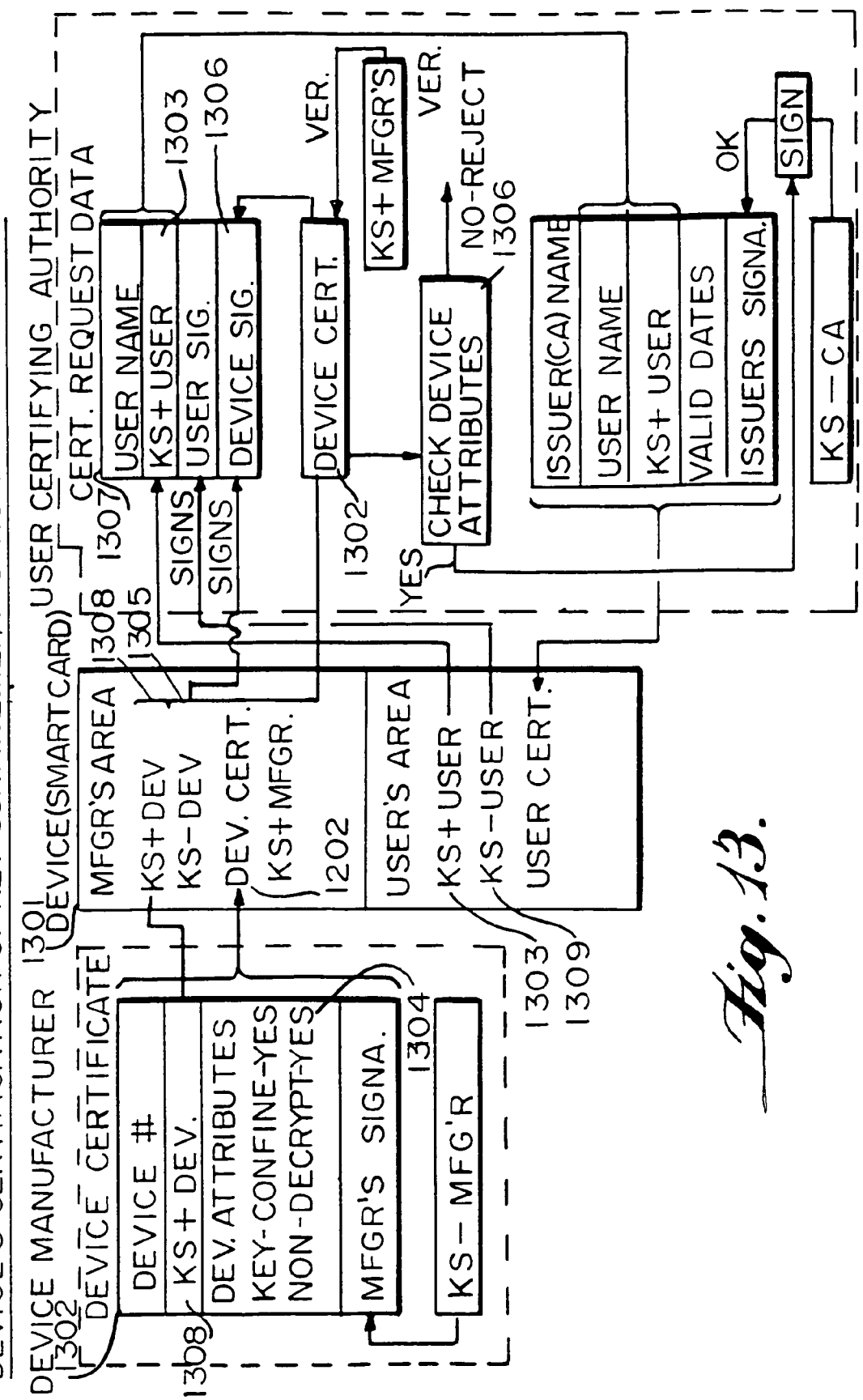
FIG. 13 is a flow chart illustrating the process of a device's certification of key confinement and non-decryption.

Thus, as illustrated in FIG. 13, when providing a public key 1303 to be certified, the card 1301 must attest that the card 1301 is tamperproof and possesses a key confining design. Proof can be provided via a "device certificate" 1302 stating that the card originates from the specific manufacturer or product line. The public key 1308 of the device 1301 must then be certified by the manufacturer or by a CA designated by the manufacturer. One likely approach to creating this device certificate would be to generate the device key pair during fabrication of the smartcard so that the corresponding device certificate 1302 could also be included on the card. The device certificate 1302 certifies the properties 1304 of the card, and the card generates a key pair 1303,1309 which is to be used by the user of the card and which the user can have certified as his own by any appropriate desired CA. Then, when submitting a newly generated public key 1303 for certification, the device private signature key 1305 would be used to countersign 1306 the certificate request data 1307, which is already signed by the newly-generated user private key 1309.

Also, in a case in which the government requires that all decryption keys be escrowed, the card should be able to certify that it is incapable of decryption. This "signature only" certification can be implemented through the same mechanisms described above, thus allowing the user's signature key to remain exempt from escrow requirements. Because it is doubtful whether an escrowed key retains any value for non-repudiation services, this certification is vital in order to prevent the signature key's disclosure through possible mishandling during an escrow process.

Smartcards should also be required to guard against unauthorized use of personal identification numbers (PINS). Normally, a smartcard is protected against unauthorized use by a PIN, the equivalent of a password. Typically, a PIN is changeable only by the user and must be a specified length, but typically nothing prevents the user from setting the PIN to a trivial number, for example all 1's or 121212. Smartcard vendors should be requested to implement PIN-change routines that insure non-trivial PINs without repeating digits or obvious patterns. Making the PIN relatively long (at least 6 digits) and non-trivial reduces the chance that the card can be operated by someone finding or stealing it. Support for a 6-digit PIN requirement can be found in "X9.26: Financial Institution Sign-On Authentication for Wholesale Financial Transactions", ANSI, 1990, which is well-known in the art and is hereby incorporated by reference and which sets forth the "one-in-a-million" standard that states that a log-in mechanism may be considered secure if, among other things, an attacker has no more than a one-in-a-million chance of guessing the correct password and if the system takes evasive action to prevent repeated guessing. Furthermore, smartcards should be required to take "evasive action", for example, shutting down for a period of time or even erasing private keys, if too many incorrect PINs are entered by an unauthorized user.

It could also be made a requirement that smartcard manufacturers use biometrics as more secure methods of identification. Extensive work is currently being done in the areas of voiceprint and fingerprint identification, as a supplement to PINs. However, while the rates of false positive and negative still must be reduced, the main problem lies in securing the biometric input device and its data channel so that they are immune to capture and replay of the biometric data. This is not a problem when the biometric device is embedded in a concrete wall, for example in an ATM or door access system, but it remains a serious problem in typical commercial office settings. Ideally, the card and biometric input device will each be tamperproof cryptographic modules that can certify themselves and establish secure channels with each other.

Smartcards should also be able to maintain an "audit trail," or an internal log of recent actions, containing at a minimum, a timestamp, transaction amount, type code and message digest. This information can be compressed into 40 or so bytes so that a 400-record circular log would consume around 16K bytes. This log would be uploaded and checked only on receipt of a signed request from the card issuer over a secure channel. Also, the card would not delete the old log until it received a signed confirmation from the issuer stating that the uploaded log had been received intact. This control mechanism will deter forgery, reduce the damage that can be caused by a forger, and allow unauthorized or questioned transactions to be investigated more quickly and easily. Since most or all transactions occur off-line from the issuer, the card is the best witness of its own actions.

Figure 3:
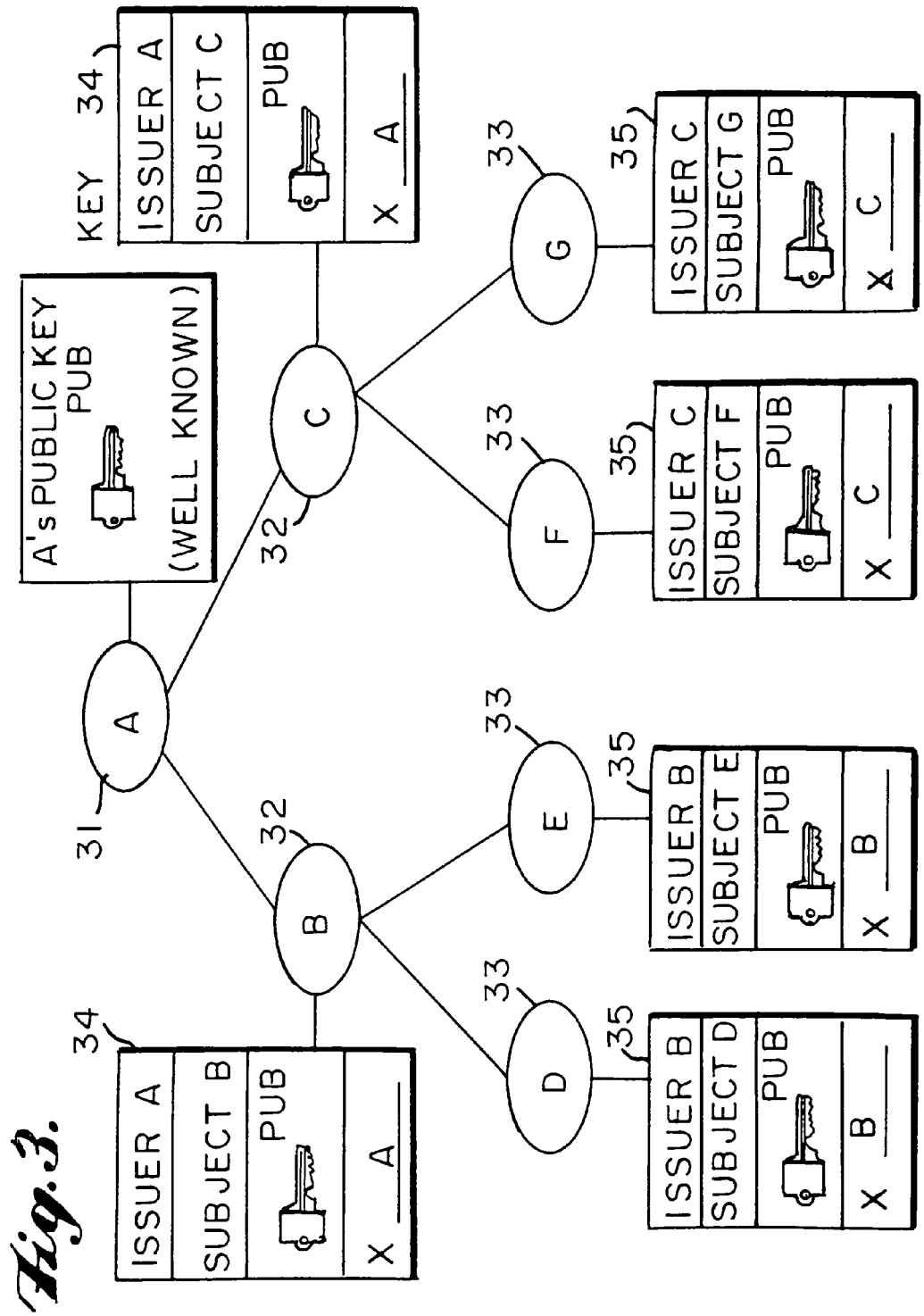
FIG. 3 shows a hierarchy of signature certification authorities.

Controlling Access to the Public Key of the Root Certifying Authority and Cost Recovery As shown in FIG. 3, in a particular cryptographic system, there may be a hierarchy of certifying authorities (31-33) issuing certificates 34, 35. In a larger system the number of certifying authorities and the depth of the hierarchy would be much greater. In the structure shown in FIG. 3 the certifying authority A (31) is the root certifying authority, with all other certifying authorities being below it. As noted in the description of FIG. 3, the public key of certifying authority A is well known. In a system where certifying authority A accepts liability for any transactions in the system based on information in certificates issued by A, it would be useful and desirable for certifying authority A (the root certifying authority) to control access to its public key. By doing so, certifying authority A could enforce rules on the system which would ensure the well-being of the structure of the system. Various methods for controlling access to the public key of a certifying authority are now described.

Figure 14:
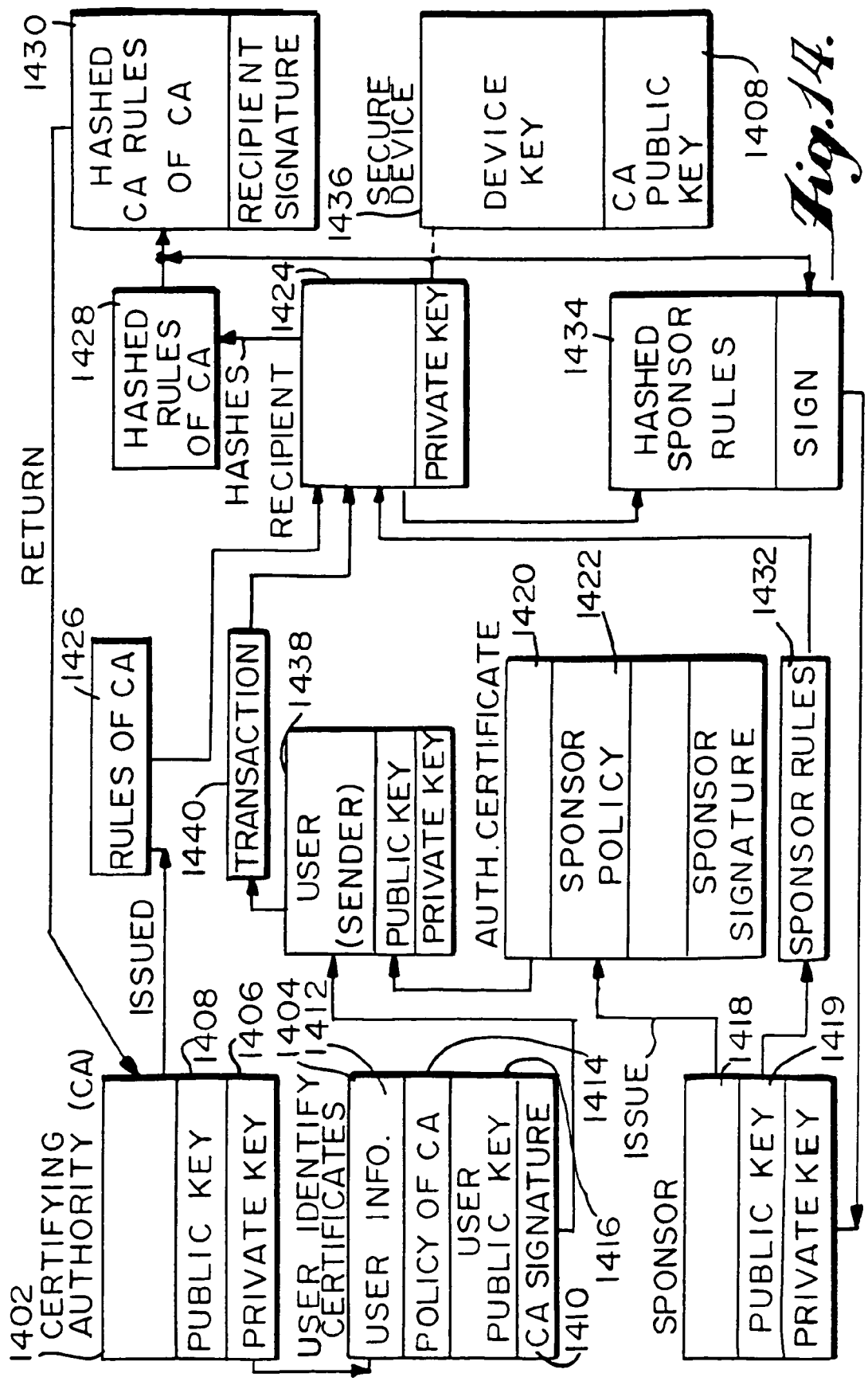
FIG. 14 is a flow chart illustrating the process of keeping public keys secret and enforcing signing of system rules.

With reference to FIG. 14, in a cryptographic system, a certifying authority (CA) 1402 issues user identity certificates 1404 to users (for example, user 1438) of the cryptographic system. Certifying authority 1402 has a private key 1406 and a public key 1408. The private key 1406 is used to digitally sign the certificates 1404 with certifying authority's digital signature 1410. Certifying authority 1402 may be any certifying authority in a hierarchy of certifying authorities, such as, for example, that shown in FIG. 3.

Certifying authority 1402 determines information about users of the system, and, based on that information, issues the certificates 1404 to those users. A certificate 1404 issued by certifying authority 1402 to a user 1438 contains user information 1410 including the user's public key 1412 and certifying authority's policy information 1414 regarding that user. In order for the information contained in the certificates 1404 to be verified by other users of the system, these other users must have access to the public key 1408 of the certifying authority 1402.

Effectively, certificates 1404 issued by certifying authorities are used by users of the system to identify themselves to other users of the system so, as to facilitate transactions within the system. A recipient (a system user) receiving a transaction 1440 from another system user 1438, where the transaction is accompanied by a certificate 1404 issued by certifying authority 1402 can rely on information in the certificate 1404, essentially because the certifying authority 1402 which issued the certificate 1404 vouches for the information in the certificate and accepts liability for certain transactions which rely on information in the certificate. If the certificate 1404 includes policy information 1414 of the certifying authority, this liability is only accepted by the certifying authority 1402 if the recipient had a valid copy of the certifying authority's public key 1406 and if the recipient followed the policy 1414 described in the certificate 1404.

Thus, for example, suppose that after verifying to its satisfaction the identity of user A (1438), certifying authority 1402 issued a certificate 1404 to user A (1438). The certificate includes the public key 1416 of user A (1438), a policy 1414 of certifying authority 1402 with respect to user A and is digitally signed by certifying authority 1402. Suppose, for example, that the policy 1414 in the certificate specified that user A can only enter into transactions on weekdays from nine in the morning to five in the afternoon. A recipient 1424 of a transaction 1440 by user A 1438 and the certificate 1404, can perform the transaction with the knowledge that certifying authority 1402 would accept liability for the transaction if (a) the recipient verified the policy 1414 for the transaction, that is, if the recipient verifies that the transaction is taking place within the allowed time bounds, and (b) the recipient had a valid copy of the public key 1408 of the certifying authority 1402. In other words, if the recipient does not check the transaction with respect to the policy then the transaction is invalid. Further, even if a recipient checks the transaction from user A and the transaction is allowed by the policy of the certifying authority with respect to user A (as specified in the certificate), the certifying authority 1402 is not liable for the transaction if the recipient was not in possession of a valid copy of the certifying authority's public key 1408.

The cryptographic system also includes various sponsors 1418 who also issue certificates to users. These sponsor-issued certificates are also known as authorization certificates 1420. These certificates 1420 function, inter alia, to specify the rules or policies 1422 of the sponsor issuing them. These authorization certificates 1420 can be separate and different from the identity certificates 1404 issued by the certifying authorities (even though the identity certificates may contain policy requirements of the certifying authorities). A user may have only one identity certificate 1404 issued by a certifying authority 1402. However, a user may have numerous authorization certificates 1420 issued by one or more sponsors 1418.

When a recipient receives a transaction from another user of the system, the recipient should also verify all sponsor policies included in authorization certificates included with the transaction from that user. Thus, in this cryptographic system, users are required to enforce the rules (policies) of the certifying authorities and sponsors in the system.

As noted above, in order for the information contained in the various certificates to be verified by users of the system, these users must have access to the public key 1408 of the certifying authority 1402 or sponsor 1418 that issued the various certificates. In order to enforce the rules of each certifying authority and sponsor in the system it is necessary to limit the access to the public key 1408 of some of the certifying authorities. In particular, it is necessary to limit access to the public key of the topmost (root) certifying authority 1402.

Accordingly, the root certifying authority 1402 keeps its public key a trade secret, and in order to obtain the public key of the root certifying authority 1402, a user (potential recipient) 1424 wishing to undertake transactions in the system must obtain the certifying authority rules 1426 issued by the root certifying authority. Recipient 1424 must hash these rules to form hashed rules 1428 which it must then digitally sign to produce a signed copy of the hashed rules 1430. This digitally signed copy of the hashed rules must be returned to the root certifying authority 1402. By these actions, the recipient 1424 agrees to abide by the rules of the certifying authority 1402 which it has just signed. The root certifying authority 1402 may also require that the recipient 1424 also obtain, sign and return rules from other certifying authorities in the system as well as from sponsors in the system. For example, recipient 1424 may also be required to obtain sponsor rules 1432 from sponsor 1418 and return a signed copy of these rules 1434 to the sponsor 1418.

Once the root certifying authority 1402 is satisfied that it has received a valid copy of the system rules signed by the recipient 1424, the root certifying authority issues its public key 1408 to the recipient 1424.

The root certifying authority public key 1424 may be issued to a recipient in a number of ways. In preferred embodiments the recipient is provided with a secure device 1436, for example, a smartcard. In one preferred embodiment the certifying authority public key 1408 is immediately available in the secure device, so that once the recipient 1424 obtains the device, he has the root certifying authority public key 1408. In another preferred embodiment, the certifying authority public key 1408 is in the device 1436 in a disabled form, and the root certifying authority 1402 enables the key 1408 in the device upon receipt and verification of the signed rules 1430.

In some cases it is useful for the root certifying authority public key 1406 in device 1436 to expire or to become inaccessible after a certain time period. In these cases, in order for the root certifying authority to reactivate the key 1406, the recipient 1424 must again obtain, sign and return the rules of the root certifying authority 1402. These rules may be different from the rules previously signed.

Different certifying authorities, including the root, may also require that other conditions be met by potential recipients before they are given access to the public keys of those certifying authorities. However, included in the system rules is an agreement by anyone signing the rules to keep them a secret.

Cost Recovery

The rules can also include agreement to pay for use of the system. Thus, when a user obtains a valid key (by agreeing to follow the rules of the root CA of the system), these rules can enforce agreement to comply with the payment scheme of the system.

A cryptographic system can link the operation of the system with associated payment by users of the system for the transactions they perform and accept. The payment for a transaction is made, for example, in the form of a pre-paid account, an agreement to be billed, or a contemporaneous payment of digital cash to various parties in the system. For example, a particular operations such as digitally signing a transaction may cost a user a certain amount to be paid to the certifying authority which issued the certificate which guarantees that user's identity.

Some digital payment functions can be built into the devices containing the public keys. Since user's private keys are typically kept in secure devices (for example, smartcards), the secure devices can be used to maintain a current digital balance for each user. This digital balance can be a debit or a credit amount. Every time a user digitally signs a transaction using his secure device, a certain amount is deducted from that user's digital balance. If the secure device is a debit device, then when the user's digital balance reaches zero the device would become disabled and no longer able to sign for the user. The user would then have to obtain further digital credit from a certifying authority or some other sponsor in the system. If, on the other hand, the secure device is a credit device, then the user might be required to perform a payment transaction to the certifying authority at certain regular intervals, for example, daily, weekly or monthly. Since the digital credit amount is available from the secure device, the certifying authority could be assured that the transaction is for the correct amount. A user who does not perform the required payment transaction would be listed in a CRL as being suspended or revoked and would no longer be able to perform transactions in the system.

Digital payment on a per transaction basis is also achieved using a confirm-to transaction. The user's authorization certificate would list the confirm-to address of the payee. Once the transaction occurs the payee is notified and can deduct payment from the user's account.

Price Information

Since a user has agreed to pay fees and royalties associated with the system, the user can also be provided with flexible pricing and billing information.

User-specific pricing policies can be implemented using certificates. Certificates issued by sponsors and certifying authorities can include payment and pricing policies for particular users. For example, a certificate might include a list of prices for certain transactions (including, for example, signing using a particular private key, verifying using a particular public key, or checking the revocation status of a particular certificate), a discount rate for particular users, a discount rate for transactions with certain recipients, and rates for bulk transactions. Some of the billing is performed by the secure devices of the users whereas other billable events can arise from actions performed by recipients of transactions.

In order to implement certain pricing policies, a certificate may contain various digital fields. For some policies, these fields include a revocation service address, a revocation service fee, and a transaction confirmation fee. The revocation service address is similar to the confirm-to address, but is used only to confirm the validity of the certificates. That is, the revocation service screens for attempted transactions based on certificates that have been withdrawn. The Revocation Service Fee is the fee charged for this service.

Examples of these fields are:
(a) Private_Key_Signing_Fee=$0.50
(b) Public_Key_verify_Fee=$0.50
(c) Revocation_Service_Address=rev-check@btec.com
(d) Revocation Service Fee=$0.50
(e) Confirm_Service Fee=$0.50

All fees can be stated as flat fees or as a fee per some amount of base transaction amount. For example, a fee can be specified as "$0.50" or as "$0.50 per $1,000 of base transaction amount".

Given the above examples, a recipient receiving a transaction could send the associated certificates to the revocation service address and would be billed at the rate specified by the service fee.

In order to charge for a confirm-to transaction, a certificate can also contain a transaction confirmation fee, for example,
Transaction_Confirmation_Fee ($0.50 per $1000 transaction amount)

In this case each confirmed transaction would cost the recipient the appropriate fee.

In some instances a recipient may receive a transaction that is too expensive and which it would therefore reject. Accordingly, a digital field indicating permission to bill the sender, the field being signed by the sender, is also included. This field could include the sender's account number and other information including a maximum acceptable billing rate etc. This "bill-sender" field would appear as an attribute in the sender's signature block.

Intellectual Property Licensing

The rules may also include agreement to pay for all intellectual property used by a user. For example, a system may offer a user patented transactions, services or algorithms, copyrighted materials, and the like. In order to a user to obtain a public key that, would enable access to this intellectual property, the user must sign the user rules agreeing to pay for use of the property.

For example, in one embodiment, the secure device contains many un-activated services (for which payment is required). Each use of one of these services requires payment in the form, for example, of digital cash, either by an internal transaction in the device or by some transaction with another user of the system. In order to obtain the device, the user must digitally sign a set of rules (using a private key in the device and unique to the device and therefore the user). By signing these rules, the user agrees to make the payments as required.

Signer Imposed Policies and Rules

A user of a cryptographic system may have an identification certificate (issued by a CA) and one or more authorization certificates (issued by CAs or sponsors of that user). Each of these certificates has policies of the issuing party, and a recipient of a transaction including any of these certificates is expected to verify that the transaction obeys all the rules specified in the certificates. It may be the case, however, that for a particular transaction, a user wishes to have more restrictive rules applied than are allowed by the certificates. For example, a user may be allowed to approve all transactions of $1 million or less, but may wish to approve a certain transaction only if its value is less than $1,000. Alternatively, a user may be allowed to approve certain transactions alone, but for a specific transaction the user may wish to require one or more co-signers. In support of this feature, the cryptographic system of the present invention provides users with the ability to add user rules, attributes and restrictions to transactions.

The user rules cannot permit transactions to be approved that would not otherwise be allowed. Therefore a recipient must always apply the most restrictive rules to every transaction. For example, if a user's certificate allows transactions up to $1,000 and the user rules specified transaction values of up to $1 million, clearly the $1,000 limit should apply. This can be achieved, for example, by the recipient applying all of the certificate rules first and then, if the transaction is still valid, applying all of the user rules. Applying the user rules first and then the certificate rules will also produce a correct result. However, since boolean combinations of rules and restrictions are supported, interleaving the user and certificate rules may produce an incorrect result if not carefully performed.

Figure 15:
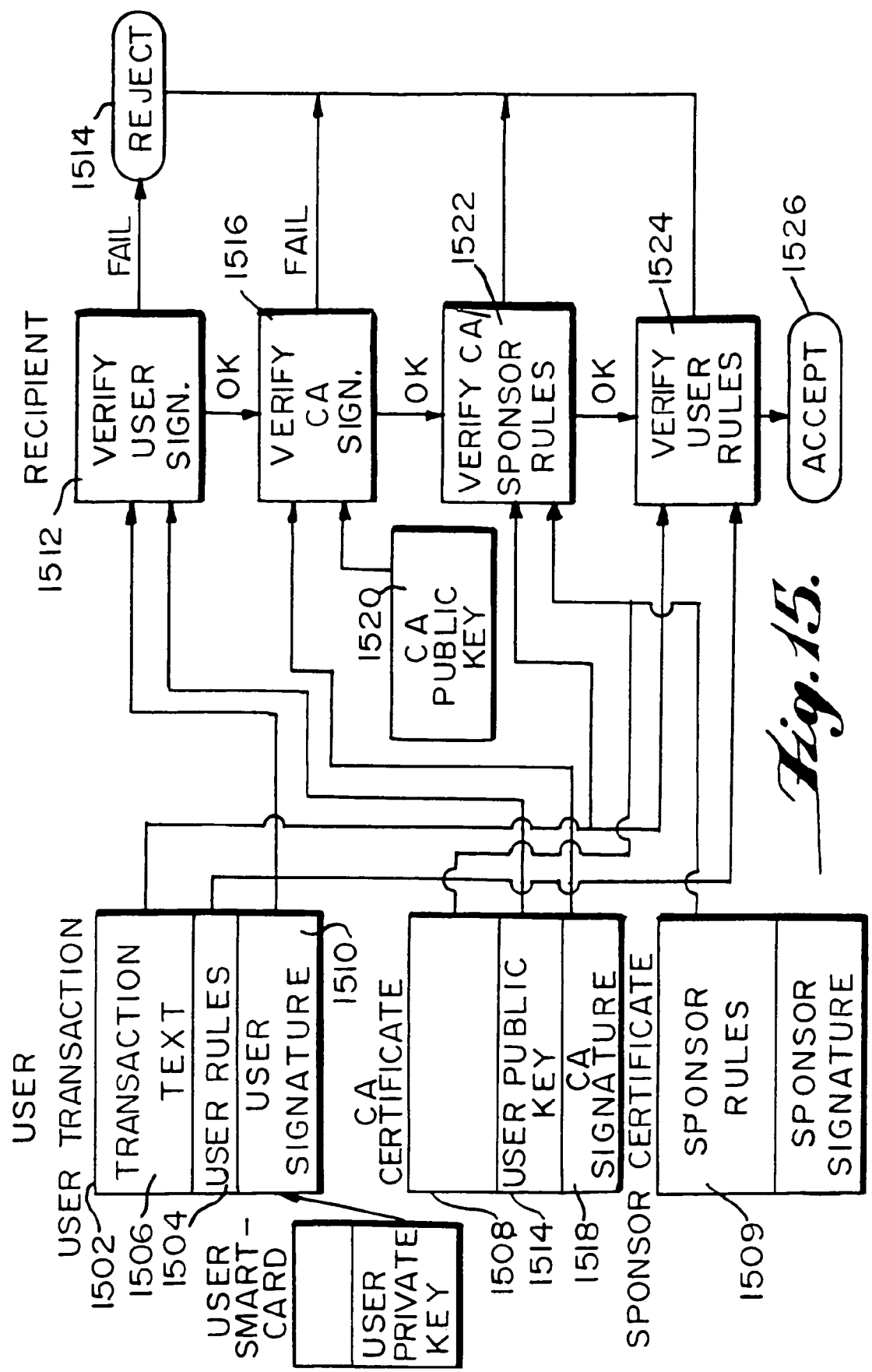
FIG. 15 is a flow chart illustrating the process of verifying user rules of a transaction.

FIG. 15 shows verification of a user transaction which includes user-supplied rules. A user transaction 1502 includes transaction text 1506 describing the transaction to be performed by a recipient. The user appends to the transaction text 1506 a set of user-supplied rules 1504 which the user wants verified by any recipient of the transaction 1502. Then the user digitally signs the combination of the transaction text 1506 and the rules 1504 to form the transaction 1502, forming a user signature 1510 which is appended to the transaction.

The transaction 1506 is then sent, along with any required sponsor and/or CA certificates, for example, with CA certificate 1508 and sponsor certificate 1509, to a recipient who must then verify the transaction. To do this, the recipient verifies 1512 the user's signature 1510 using the user's public key 1514 from the CA certificate 1508. If the user's signature is accepted, verification continues, otherwise the transaction is rejected 1514. If verification continues, the recipient verifies 1516 the CA's signature 1518 using the CA's public key 1520. If the CA's signature is accepted, verification continues 1522 with the checking of the rules in all certificates and those supplied by the user, including sponsor certificate 1509. Otherwise, the transaction is rejected 1514. If verification continues, the recipient verifies 1522 the transaction against the rules in the CA certificate 1508, sponsor certificate 1509 (and in any other certificates associated with this transaction). If any of these rules are not satisfied the transaction is rejected 1514, otherwise verification of the transaction continues with the verification of the transaction with respect to the user-supplied rules 1504. Only if the transaction satisfies the user provided rules 1504 is it accepted 1526, otherwise it is rejected 1514.

The user-supplied rules 1504 can be any combinations of the rules known to the system, including, but not limited to co-signature requirements, temporal limits, transaction amount limits, confirm-to requirements and the like.

In some environments users may create sets of rules or default rules for themselves for use with particular types of users or transactions. These sets of rules or defaults may be automatically attached to all transactions from those types of users or transactions. For example, a user who is bank manager may determine (from experience) that for all transactions by new tellers that she countersigns, she is going to apply more restrictive rules than the bank requires. She would then store these rules in her system as a default for those kinds of transactions that she signs or countersigns.

One skilled in the art will appreciate that the present invention is typically practiced using electronic devices such as digital electronic computers and the like, and that the certificates, transactions, messages, signatures and the like are digital electronic signals generated by the electronic devices and transmitted between the electronic devices.

Thus, a method for securely using digital signatures in a commercial cryptographic system is provided. One skilled in the art will appreciate that the present invention can be practiced by other than the described embodiments, which are presented for purposes of illustration and not limitation, and the present invention is limited only by the claims that follow.

What is claimed is:

1. In a cryptographic system wherein a certifying authority issues digital certificates identifying users of said system, said digital certificates being digitally signed with a private key of said certifying authority to form a digital signature and requiring a public key of said certifying authority in order to verify said digital signature, and wherein a user transaction in said cryptographic system requires verification by a recipient of said user transaction, said verification based on information in said digital certificates and requiring said public key, a method of controlling use of said public key comprising:

by said recipient, digitally signing at least one message containing rules of said system, by which said recipient agrees to said rules, said rules including a rule regarding maintaining secrecy of said public key; and in response to said digital signing, permitting said recipient to utilize said public key and prior to said digital signing, denying utilization of said public key.

2. The method of claim 1, wherein said recipient has a secure device containing said public key, wherein said public key cannot be obtained from said secure device.

3. The method of claim 1, wherein each user of the system has a private key, and wherein said rules include:

a rule requiring payment to a third party upon each use of said public key;

a rule requiring payment to a third party upon each use of a user's private key;

a rule requiring payment to a third party upon each certification of a certificate's status; or a rule requiring payment to a third party upon each confirm-to transaction by a user.

4. The method of claim 1, wherein said rules include a rule to pay for use by said recipient of intellectual property provided through the system.

5. The method of claim 1, wherein said user transaction is invalid until said digital signing is performed.

6. The method of claim 1, further comprising:

in response to said signing by said recipient, said certifying authority accepting a transaction from said recipient, said transaction based on said user transaction.

7. A method of enforcing a security policy in a cryptographic system, said policy including controlling use of a public key utilizable by a plurality of users of the cryptographic system, said method comprising:

in response to a recipient digitally signing a message containing rules of said cryptographic system, by which said recipient agrees to said rules, permitting said recipient to utilize said public key, said rules including a rule regarding maintaining secrecy of said public key; and prior to said recipient digitally signing said message, denying use of said public key.

8. The method of claim 7, wherein said recipient has a secure device containing said public key, wherein said public key cannot be obtained from said secure device.

9. The method of claim 7, wherein each user of the system has a private key, and wherein said rules include:

a rule requiring payment to a third party upon each use of said public key;

a rule requiring payment to a third party upon each use of a user's private key;

a rule requiring payment to a third party upon each certification of a certificate's status; or a rule requiring payment to a third party upon each confirm-to transaction by a user.

10. The method of claim 7, wherein said rules include a rule to pay for use by said recipient of intellectual property provided through the system.

11. The method of claim 7, wherein a user transaction of said recipient in the system is invalid until said digital signing is performed.

12. The method of claim 7, further comprising:

in response to said signing by said recipient, a certifying authority accepting a transaction from said recipient, said transaction based on a user transaction of said recipient in the system.

13. The method of claim 1, wherein the public key becomes inactive after a certain time period, the system further comprising:
- after the public key becomes inactive,
  - in response to a demonstration by the recipient of agreement or consistency with one or more of the rules, activating the inactive public key.

14. The method of claim 13, wherein said demonstration includes information identifying operational capabilities of a secure hardware device and further including information uniquely binding said recipient to said demonstration by the recipient of agreement or consistency with one or more of the rules.

15. The method of claim 1, wherein the public key is certified by an authority.

16. The method of claim 1, wherein said permitting comprises making the public key available by providing access to an inaccessible public key.

17. The method of claim 1, further comprising:
- a certifying authority accepting a transaction from the recipient, the transaction based on a transaction of the recipient in the cryptographic system, after demonstration by the recipient of agreement or consistency with one or more of the rules.

18. The method of claim 1, wherein said permitting comprises:
- in response to a predetermined transaction with a secure device, activating said public key in said secure device, said predetermined transaction including information from the secure device identifying operational capabilities of the secure device and uniquely identifying said secure device and further including information uniquely binding said recipient to said predetermined transaction, wherein said public key cannot be obtained from said secure device.

19. The method of claim 7, wherein a secure device contains an inactive form of said public key and said permitting comprises activating said inactive public key in said secure device.

20. The method of claim 7, wherein said permitting comprises transferring said public key to said secure device.

21. The method of claim 7, wherein said public key is provided in a secure device.

22. The method of claim 21, wherein said public key in said secure device becomes inactive after a certain time period, said method further comprising:
- after said public key becomes inactive,
  - in response to a demonstration by the recipient of agreement or consistency with one or more of the rules, activating said inactive public key in said secure device.

23. The method of claim 22, wherein said demonstration includes information identifying operational capabilities of the secure device and further including information uniquely binding said recipient to said demonstration by the recipient of agreement or consistency with one or more of the rules.

24. The method of claim 7, wherein said permitting comprises transferring the public key to a secure device, wherein the public key cannot be obtained from the secure device.

25. The method of claim 7, where, in the cryptographic system, a certifying authority issues digital certificates identifying participants of the cryptographic system, the digital certificates being digitally signed with a private key of the certifying authority to form a digital signature and requiring a public key of the certifying authority in order to verify the digital signature, and a participant transaction requires verification by a recipient of the participant transaction, the verification based on information in a digital certificate and requiring the public key.

26. The method of claim 7, further comprising:
- a certifying authority accepting a transaction from the recipient, the transaction based on a transaction of the recipient in the cryptographic system, after demonstration by the recipient of agreement or consistency with one or more of the rules.

27. The method of claim 7, wherein said permitting comprises making the public key available by activating an inactive public key.

28. The method of claim 7, wherein said permitting comprises:
- in response to a predetermined transaction with a secure device, activating said public key in said secure device, said predetermined transaction including information from the secure device identifying operational capabilities of the secure device and uniquely identifying said secure device and further including information uniquely binding said recipient to said predetermined transaction, wherein said public key cannot be obtained from said secure device.

* * * * *